US007044222B2

(12) United States Patent
Tomlinson

(10) Patent No.: US 7,044,222 B2
(45) Date of Patent: *May 16, 2006

(54) COMPOSITION FOR CONTROLLING WELLBORE FLUID AND GAS INVASION AND METHOD FOR USING SAME

(75) Inventor: Brian Henry Tomlinson, Baku (AZ)

(73) Assignee: Halliburton Energy Services, Inc., Houston, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 10/297,752

(22) PCT Filed: Jun. 5, 2001

(86) PCT No.: PCT/GB01/02471

§ 371 (c)(1),
(2), (4) Date: Mar. 13, 2003

(87) PCT Pub. No.: WO01/93842

PCT Pub. Date: Dec. 13, 2001

(65) Prior Publication Data
US 2004/0040711 A1    Mar. 4, 2004

Related U.S. Application Data

(63) Continuation of application No. 09/588,422, filed on Jun. 6, 2000, now Pat. No. 6,664,215.

(51) Int. Cl.
E21B 33/138 (2006.01)

(52) U.S. Cl. .................. 166/292; 166/300; 507/269
(58) Field of Classification Search ........ 166/292–295, 166/300; 507/269
See application file for complete search history.

(56) References Cited

U.S. PATENT DOCUMENTS

| 1,019,083 | A |   | 3/1912  | Pink |
| 1,634,505 | A |   | 7/1927  | McCaughey |
| 2,351,641 | A |   | 6/1944  | Sohl et al. |
| 2,543,959 | A |   | 3/1951  | Eastin |
| 2,939,799 | A |   | 6/1960  | Chisholm |
| 3,320,077 | A |   | 5/1967  | Prior |
| 3,816,148 | A |   | 6/1974  | Barthel |
| 3,887,009 | A | * | 6/1975  | Miller et al. ............ 166/292 |
| 3,951,885 | A |   | 4/1976  | Thompson |
| 3,963,849 | A |   | 6/1976  | Thompson |
| 4,158,570 | A |   | 6/1979  | Irwin |
| 4,209,339 | A |   | 6/1980  | Smith-Johannsen |
| 4,352,694 | A |   | 10/1982 | Smith-Johannsen |
| 4,480,693 | A |   | 11/1984 | Newlove et al. |
| 4,886,550 | A |   | 12/1989 | Alexander |
| 5,004,505 | A |   | 4/1991  | Alley et al. |
| 5,039,454 | A |   | 8/1991  | Policastro et al. |
| 5,110,361 | A |   | 5/1992  | Alley et al. |
| 5,213,161 | A |   | 5/1993  | King et al. |
| 5,220,960 | A |   | 6/1993  | Totten et al. |
| 5,228,524 | A |   | 7/1993  | Johnson et al. |
| 5,281,270 | A |   | 1/1994  | Totten et al. |
| 5,298,069 | A |   | 3/1994  | King et al. |
| 5,504,062 | A |   | 4/1996  | Johnson |
| 6,664,215 | B1 |  | 12/2003 | Tomlinson |

FOREIGN PATENT DOCUMENTS

| EP | 0 558 232 | 2/1993 |
| EP | 0 582 367 | 5/1993 |
| RU | 2015155   | 6/1994 |
| RU | 2060360   | 5/1996 |

OTHER PUBLICATIONS

Excerpts from www.baymag.com web site. Date: Undated.
Excerpts from www.britmag.co.uk and www.administrationassets.co.uk web sites. Date : Undated.
Tomlinson, Brian H., "The Technology of Thermosetting Compounds", Journal of The Canadian Association of Drilling Contractors, 1995.

* cited by examiner

Primary Examiner—Zakiya Walker
(74) Attorney, Agent, or Firm—Jansson, Shupe, Munger & Antaramian, Ltd.

(57) ABSTRACT

Compositions for controlling wellbore fluid and gas invasion including methods for using the compositions. The compositions are initially flowable slurries preferably comprising about 70 to 30% by weight of magnesium oxychloride and about 70 to 30% by weight of water. The compositions undergo a rapid phase transition to form a substantially solid mass with a near-linear relationship between the time required for the phase transition to occur and the composition temperature at which the phase transition occurs thereby permitting accurate determination of the set time. The method includes use of the composition to control the loss of fluids and gases from the wellbore.

35 Claims, 21 Drawing Sheets

Result: Analysis Table

| ID:BPAmoco | Run No: 7 | Measured: 9/1/99 9:36AM |
|---|---|---|
| File: MATT | Rec No: 8 | Analysed: 9/1/99 9:36AM |
| Path C:\SIZERS\DATA\ | | Source: Analysed |

Range: 300RF mm  Beam: 2.40 mm  Sampler: MS17  Obs': 16.2%
Presentation: 3_PHD  Analysis: Polydisperse  Residual: 0.759%
Modifications: None Conc. = 0.0083 %Vol  Density = 2.710 g/cm^3  S.S.A. = 0.9417 m^2/g
Distribution: Volume  $D[4, 3]$ = 15.07 um    $D[3, 2]$ = 2.35 um
$D(v, 0.1)$= 1.46 um  $D(v, 0.5)$ = 6.41 um   $D(v, 0.9)$ = 42.38 um
span = 6.386E+00  Uniformity = 1.879E+00

| Size (um) | Volume Under% | Size (um) | Volume Under% | Size (um) | Volume Under% | Size (um) | Volume Under% |
|---|---|---|---|---|---|---|---|
| 0.05 | 0.00 | 0.67 | 4.83 | 9.00 | 59.59 | 120.67 | 100.00 |
| 0.06 | 0.01 | 0.78 | 5.24 | 10.48 | 63.33 | 140.58 | 100.00 |
| 0.07 | 0.04 | 0.91 | 5.89 | 12.21 | 66.75 | 163.77 | 100.00 |
| 0.08 | 0.10 | 1.06 | 6.80 | 14.22 | 69.90 | 190.80 | 100.00 |
| 0.09 | 0.19 | 1.24 | 8.07 | 16.57 | 72.87 | 222.28 | 100.00 |
| 0.11 | 0.32 | 1.44 | 9.79 | 19.31 | 75.71 | 258.95 | 100.00 |
| 0.13 | 0.51 | 1.68 | 12.01 | 22.49 | 78.47 | 301.68 | 100.00 |
| 0.15 | 0.76 | 1.95 | 14.81 | 26.20 | 81.28 | 351.46 | 100.00 |
| 0.17 | 1.07 | 2.28 | 18.19 | 30.53 | 84.12 | 409.45 | 100.00 |
| 0.20 | 1.45 | 2.65 | 22.13 | 35.56 | 86.93 | 477.01 | 100.00 |
| 0.23 | 1.88 | 3.09 | 26.54 | 41.43 | 89.62 | 555.71 | 100.00 |
| 0.27 | 2.36 | 3.60 | 31.31 | 48.27 | 92.07 | 647.41 | 100.00 |
| 0.31 | 2.85 | 4.19 | 36.28 | 56.23 | 94.20 | 754.23 | 100.00 |
| 0.36 | 3.31 | 4.88 | 41.32 | 65.51 | 96.01 | 878.67 | 100.00 |
| 0.42 | 3.73 | 5.69 | 46.28 | 76.32 | 97.49 | | |
| 0.49 | 4.11 | 6.63 | 51.03 | 88.91 | 98.65 | | |
| 0.58 | 4.47 | 7.72 | 55.49 | 103.58 | 99.49 | | |

Figure 14B:
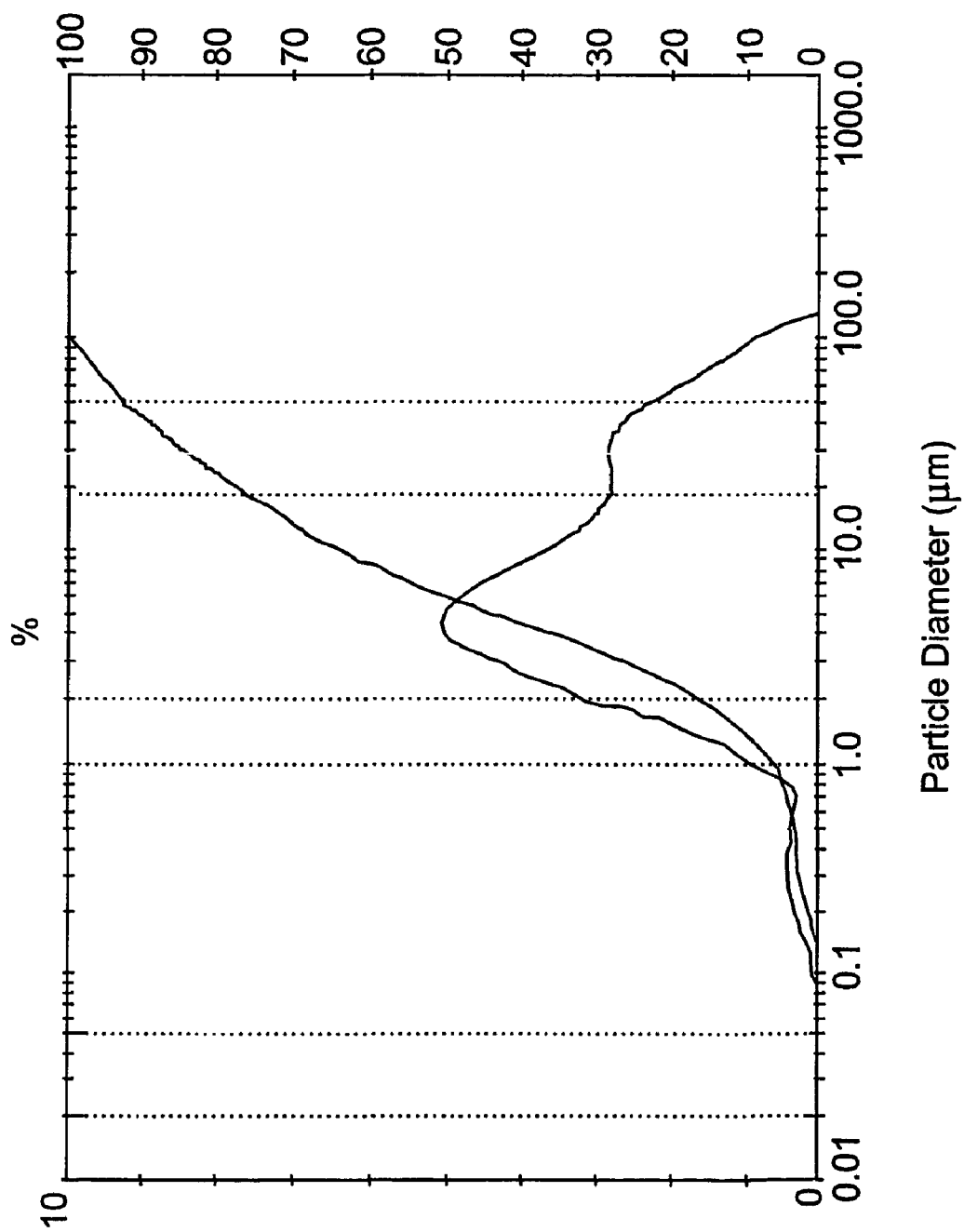

*Fig. 14a*

| Date: | | Results Sheet: |
|---|---|---|

| Formulation: Mixing Order | Comments |
|---|---|
| Water, ml<br>T-Tek, g<br>C-Tek, g<br>V-Tek, g<br>R-Tek, g<br>Dolomite, g<br>Silica, g | |

Consistometer Test Profile
  Temp. Ramp=    °C final after 50 mins.          Bc Reading  Time (mins)
         Initial Pressure = 4,000 psi
    Pressure Ramp= 10,000 psi final after 50 mins.          10
                                                            20
                                                            40
                                                            60
                                                            80
                                                            100

During Test

| Time, mins | Temperature, C | Pressure, Psi | Volts |
|---|---|---|---|
| 0 | | 4,000 | |
| 2 | | 4,250 | |
| 4 | | 4,500 | |
| 6 | | 4,750 | |
| 8 | | 5,000 | |
| 10 | | 5,250 | |
| 12 | | 5,500 | |
| 14 | | 5,750 | |
| 16 | | 6,000 | |
| 18 | | 6,250 | |
| 20 | | 6,500 | |
| 22 | | 6,750 | |
| 24 | | 7,000 | |
| 26 | | 7,250 | |
| 28 | | 7,500 | |
| 30 | | 7,750 | |
| 32 | | 8,000 | |
| 34 | | 8,250 | |
| 36 | | 8,500 | |
| 38 | | 8,750 | |
| 40 | | 9,000 | |
| 42 | | 9,250 | |
| 44 | | 9,500 | |
| 46 | | 9,750 | |
| 48 | | 10,000 | |
| 50 | | 10,000 | |
| 51 | | 10,000 | |

COMPOSITION FOR CONTROLLING WELLBORE FLUID AND GAS INVASION AND METHOD FOR USING SAME

This is a national stage application filed under 35 U.S.C. § 371 of International Application No. PCT/GB01/02471 filed Jun. 5, 2001 which is a continuation of U.S. patent application Ser. No. 09/588,422 filed Jun. 6, 2000, now U.S. Pat. No. 6,664,215. The entire contents of such applications are incorporated herein by reference.

FIELD OF THE INVENTION

This invention is related generally to compositions and methods for use in drilling operations and, more specifically, to compositions for use in sealing wellbores and methods of using such compositions.

BACKGROUND OF THE INVENTION

People and businesses in the oil and gas industry and, potentially, any industry involved in drilling into earthen formations, confront a number of important problems with respect to extraction of hydrocarbon fluids, gases, and other materials from underground reservoirs. These problems include, among others, the need to prevent the escape and loss of underground fluids and gases which are driven under pressure from the earthen formations and into the wellbore, the need to avoid contamination of, and damage to, the earthen formations and subterranean fluids and gases surrounding the wellbore, the need to seal wellbores in a manner which is noninvasive to the surrounding earthen formations upon completion of the drilling operation and the need to control the drilling apparatus so as to properly position the wellbore.

Control of the movement of underground fluids and gases into the wellbore during a drilling operation represents a particularly significant problem, both with respect to economic and safety-related issues.

Underground fluids and gases are typically under extreme pressure, referred to as "formation pressure." This formation pressure causes surrounding fluids and gases to be driven from the underground production formations and reservoirs and into the wellbore positioned in the earthen formations surrounding the formations and reservoirs. If uncontrolled, these formation pressures cause oil, gas, water, brine and other subterranean materials to be forced into the wellbore and out onto surrounding ground surfaces or into the atmosphere.

As can be readily understood, the loss of these materials and the potential damage and contamination which can be caused by the uncontrolled flow of these materials is economically undesirable. Moreover, uncontrolled loss of flammable hydrocarbon materials from the pressurized production zone, can result in a condition known as a "wellbore blowout." A wellbore blowout is highly undesirable because of the potential fire and explosion hazard created by the uncontrolled flow of flammable fluids and gases from the wellbore.

It is common industry practice to use drilling fluids and cement systems to attempt to control the potential loss of underground fluids and gases from the wellbore. These drilling fluids and cement systems are pumped directly into the wellbore where, it is anticipated, they will be deposited against the wellbore walls, thereby sealing those walls and limiting unwanted fluid and gas outflow. For example, prior art drilling fluids use a mechanism, known as filtration, to "screen out" or deposit wellbore cuttings and additives present in the drilling fluid against the wellbore walls. This layer, also called a "filter cake," is deposited along the wellbore walls as the drilling fluid is forced by hydrostatic fluid column pressure, into the permeable earthen formations surrounding the wellbore. The additives may include polymers and viscosity modifiers which enable the fluid to support, or carry, the wellbore cuttings and other particulates prior to their screen out or deposition onto the wellbore face. A wide range of additives, including organic additives such as coconut husks and carbohydrate materials, have been used in combination with drilling fluids to seal the wellbores.

However, these drilling fluid systems are not complete solutions to the problem of unwanted fluid and gas loss from the wellbore. These drilling fluid systems are disadvantageous because they limit, but do not fully prevent, hydrocarbon loss. Drilling fluids are ineffective in forming a complete seal along the wellbore walls because the filter cake is permeable and is subject to dynamic erosion by the continuous circulation of the drilling fluid. Dynamic erosion is a continuous process of deposition and erosion which occurs during the drilling operation. In highly permeable earthen formations, this erosion can remove any filter cake and erode the surrounding earthen formation resulting in very poor seal formation during casing operations due to "wash-out," or enlargement, of the wellbore.

Various cements, including Portland-type cements and cements including magnesium oxysulphate materials such as MAGNAPLUS brand cements available from B. J. Hughes, have also been used for sealing wellbore walls and for limiting the unwanted loss of fluids and gases from the earthen formations. These cement systems can be used in combination with the drilling fluid systems previously described. Such cements have been used for, among other things, grouting well casings, plugging abandoned wells and, occasionally, for sealing off permeable structures from adjacent fluids. As with the drilling fluids, the cement is typically pumped directly into the wellbore and into contact with the wellbore walls.

However, these cement systems have important disadvantages with respect to their use in wellbore operations. These limitations are due to the inherent physical properties of such materials and, importantly, their slow phase transition from a flowable to a solid state. Specifically, Portland-type cements and magnesium oxysulphate cements are thixotropic cements which form a gel structure during the transition between their slurry (i.e., flowable) and solid states. During this transition, and as the gel is formed, the cement slurry acquires a slight supportive strength. The increase in supportive strength reduces the hydrostatic pressure exerted by the cement fluid column on the geologically-exposed formations in the wellbore. The hydrostatic pressure created by the cement fluid column in the open wellbore is important because it is the only control factor to contain formation pressures. In the case of a pressurized zone, such as the production zone, the reduction in hydrostatic pressure of the cement fluid column can allow an influx of gases or fluids into the wellbore further reducing hydrostatic pressure. The cumulative loss in hydrostatic pressure can allow a sufficient influx of gases or fluids into the wellbore to cause an undesirable wellbore blow-out.

Another adverse consequence of the hydrostatic pressure reduction is referred to as "channelling." Channelling occurs when fluids or gases transit through the gelled cement and form channels. These channels become part of the cement structure when the cement has set. The channels are highly disadvantageous because they allow leakage of gases and fluids through the channels even after the wellbore casing has been set and cemented. Such channelling often requires the use of expensive remedial clean up, fracturing or squeezing operations.

Not only are these prior art drilling fluid and cement systems incomplete solutions to the problem of preventing unwanted fluid and gas loss but they may also contribute to contamination and damage of earthen formations surrounding the wellbore and the fluid and gas reservoirs themselves. Contamination caused by drilling fluids and cements is referred to in industry as "invasiveness." This type of contamination can occur because the use of drilling fluids is a dynamic process which can cause continuous fluid invasion of the permeable earthen formations surrounding the wellbore as the fluids are circulated within the wellbore. Once in the formations, the drilling fluid can then invasively interact with that formation to cause swelling, or dispersion, of reactive shales, or washout of unconsolidated sands, all of which can lead to wellbore instability and contamination of the surrounding hydrocarbon reservoirs.

Cement systems can also cause invasive contamination of the surrounding earthen formations, particularly as the cements are forced back into the formations by the hydrostatic pressure of the wellbore fluid column. Such contamination typically occurs during the time that the cement is in the gel, or flowable, phase. The cement filtrate, in particular, can be forced into the formation leaving solid, particulate material screened out against the wellbore face. The fluid forced back into the formation can cause problems such as water-wetting of preferentially oil-wet formations resulting in water blocking of the hydrocarbon fluids and gases.

It is well known and documented that such fluid filtrate invasion can cause damage to hydrocarbon-producing formations, or reservoirs, resulting in reduced production and/or expensive attempts at remedial operations to either remove, or bypass, the damage. This is particularly the case where production areas are concerned. In addition, the cement solid can be weaker because of the separation of the fluid filtrate from the particulate material. This condition can contribute to the undesirable loss of control over the flow of fluids and gases from the well bore.

These Portland-type and magnesium oxysulphate-based cement systems also have disadvantages with respect to removal of the hardened cement from the wellbore periphery—potentially resulting in further damage to the earthen formations. It is often necessary to remove the cement plug from the wellbore, for example in remedial operations. Magnesium oxysulphate-based cements can be solvated and removed with a solution containing about 15% hydrochloric acid (HCl). Such solvent is pumped directly into the wellbore to remove the cement. Portland cements are not soluble in a 15% HCl solution but can be solvated and removed with a stronger acid, such as hydrofluoric acid (HF). However, HF is undesirable because it can leave damaging deposits as a by-product of acidization.

However, acid solubility is irrelevant if the acid cannot come into contact with the cement or drilling fluid particulates. Prior art cement and drilling fluid system filtrates are often forced so far back into a formation that they cannot be contacted and solvated by the acid. The cement and drilling fluid particulates which cannot be removed remain in the earth as a potential contaminate. Invasive setting of concrete is a particular problem when seeking to reopen a wellbore which was sealed and closed for any reason. The well cannot be fully reopened by drilling out when the concrete has migrated back into the formation and the solvent solution cannot contact and solubilize the cement. In these cases, redrilling by side tracking is the usual remedy.

Sorel cements are another type of known cement. These cements contain magnesium oxychloride and have been used in applications such as for fire bricks and ornamental masonry where unpredictable pressure and temperature conditions are not applicable. These magnesium oxychloride cements have not been used in wellbore operations for many reasons including the inherent unpredictability of their setting properties. This is a major failing of these types of cements because operators must be able to calculate the amount of time that they have to work with the cement before it becomes a solid mass so as to be able to fully seal the wellbore or position equipment in the wellbore.

Specifically, when certain magnesium oxychloride cements are subjected to an increasing temperature/pressure gradient, they can become exothermically unstable. Under these conditions, the cement undergoes an exponential, non-linear, increase in internal temperature resulting in a runaway, or "flash set." These cements are less than satisfactory precisely because the phase transition reaction occurs quickly, and without a predictable control parameter allowing predictable setting times. The reaction is so rapid that it is difficult to predictably control the setting of the cement even with use of retarding or accelerating compounds. In addition, certain of these magnesium oxychloride cements can have low compressive strengths and may degrade under conditions of high pressure. Other types of magnesium oxychloride cements are less reactive but undergo an extended gel phase before forming a solid. The gel phase is subject to all of the foregoing disadvantages including the disadvantages associated with invasiveness and channelling. Therefore, magnesium oxychloride cements have been deemed unacceptable for use in wellbore operations.

Yet another problem confronting the drilling industry involves the need to control the drilling apparatus in order to locate the wellbore in a predetermined position. For example, Portland-type cements are used for a drilling process known as "kickoff drilling." In kick-off drilling operations, cement plugs are set in the wellbores of horizontal, multilateral and/or vertical wells. The drill is then used to partially drill through the plug. The drill is then kicked-off, or drilled-off of the plug at the required angle and direction into the surrounding formation.

A major problem can arise following this operation. For example, when drilling a well which is to be in a horizontal, or angled plane, the wellbore makes the transition to horizontal from vertical in what is known as a "build" section. In a build section the angle from the vertical is gradually increased in order to avoid sharp angles known as "dog legs." Dog legs are problematic when running the drill string in or out of the hole. If the formation in the build section is soft, unstable or unconsolidated it can be eroded or "washed out" by the wellbore circulating fluids pumped down hole under pressure. In addition, any kind of fluid or gas influx in this area will exacerbate the tendency to wash out this area. Major difficulties can then be encountered when running in or pulling out of the hole and the drillstring may become stuck.

Portland cements are sometimes used in an attempt to stabilize this area. The cement may be either placed across the section or "squeezed" back into the formation. The cement is then drilled out. The problem then often arises of drilling out the cement "on track," that is maintaining the same direction and angle as the original wellbore. When Portland cements are used, the drill string has a tendency to drill-off, or kick-off, the hard plug into the surrounding softer formation. In severe cases, the resultant dog legs in the wellbore can cause severe drag when running in or out of the hole and it may be impossible to run casing.

A far better method of controlling the drilling apparatus would be to provide a cement which could be easily drilled out when placed across these build sections and would prevent the kick-off situation from occurring. At the same time, the cement would have sufficient compressive strength to stabilize the surrounding section. As discussed, Portland type cements are often unsuitable for such an operation because of the hardness and chemical characteristics of the cement.

It would be a significant improvement in the art to provide an improved composition for limiting, or preventing, the influx of fluids or gases into the wellbore from the surrounding permeable formations, which would be non-invasive, which would be easily removable from the wellbore and other surrounding formations, which would allow the correct positioning of the drillstring and which would have predictable and controllable physical properties capable of permitting engineered application of the composition in a variety of environments and conditions.

OBJECTS OF THE INVENTION

It is an object of this invention to provide improved compositions and methods that overcome some of the problems and shortcomings of those of the prior art.

Another object of this invention is to provide compositions for sealing off geotechnical and permeable formations, and methods of using such compositions, in which the compositions have a compressive strength and form little or no gel between the flowable (i.e., slurry) and set states and therefore limit or prevent fluid or gas channelling from occurring as a result of reduced hydrostatic pressure.

It is a further object of this invention to provide improved compositions, and methods of using such compositions, in which the compositions are settable materials that generate sufficient strength to contain formation pressures.

An additional object is to provide compositions, and methods of using such compositions, in which the composition set time may be predictably determined.

Yet another object of this invention is to provide compositions, and methods of using such compositions, in which the compositions are settable materials that are impermeable to fluids or gases when set.

It is a further object of this invention to provide compositions, and methods of using such compositions, in which the compositions are noninvasive to a surrounding permeable production formation thereby minimizing potential damage to the formation and the consequent loss of hydrocarbon production.

An additional object is to provide compositions, and methods of using such compositions, in which the compositions are acid soluble and can be removed from the wellbore.

Another object is to provide compositions, and methods of using such compositions, in which the composition phase transition from a flowable to a set state is rapid and predictable.

It is also an objective to provide compositions, and methods of using such compositions, in which the compositions do not require the addition of any polymers or organic additives as a requirement for their application or performance thereby avoiding possible damage to hydrocarbon-producing formations.

A further objective is to provide compositions, and methods of using such compositions, in which the compositions are settable, impermeable, materials with a compressive strength sufficient for consolidating unstable geological formations.

It is also an objective to provide compositions, and methods of using such compositions, in which the compositions are settable, impermeable, materials having sufficient compressive strength, yet are easily drillable and which will allow for control of both direction and angle during the drilling out of a soft formation.

These and other important objects will be apparent from the following descriptions of this invention which follow.

SUMMARY OF THE INVENTION

The invention is a composition for controlling wellbore fluid and gas invasion and a method of using the composition, particularly to control the loss of said fluids and gases from the wellbore. The composition is effective in forming a seal along the face of the wellbore thereby preventing fluids and gases from being driven into the wellbore by formation pressures. The composition has properties which make it possible for users to accurately determine and adjust the composition set time providing a previously unknown level of control and performance.

The composition preferably comprises about 70 to 30% by weight of magnesium oxychloride and about 70 to 30% by weight of water. The composition is a flowable slurry at composition temperatures below about 60° C. but undergoes a phase transition to form a substantially solid mass (also referred to herein as a "set") upon reaching a typical composition temperature of between about 60–68° C. depending on particle size.

Other set temperatures can be used with other compositions of the invention. For example, other compositions have a set temperature of between about 100–140° C.

Compositions of the invention are preferably prepared by first making a brine solution comprising a magnesium chloride salt and water followed by addition of the inventive magnesium oxide powder to the brine to form a flowable slurry. Preferably, the slurry is a reaction product comprising an admixture of about 70 to 50% by weight of the brine and about 50 to 30% by weight of magnesium oxide powder. The magnesium oxide reacts with the brine to form a magnesium oxychloride slurry. It is preferred that the inventive magnesium oxide powder has a median particle size diameter of between about 2–8μ and a bulk density of about 1–3.5 g/cm$^3$. While not preferred, the inventive compositions may be prepared in other mixing orders, for example, by admixing the magnesium oxide powder and water before addition of the magnesium chloride to the water.

Various optional constituents may be included to impart desired properties to the compositions. Preferred optional constituents may include fillers, such as dolomite. Inhibitors for controlling the time in which the composition sets to form the solid state product may also be included. Preferred inhibitors may include sodium hexametaphosphate, potassium magnesium phosphatehexahydrate and potassium magnesium hexametaphosphate. Mixtures of the inhibitors may be used. Weighting agents for controlling slurry mass may be also be added. Such weighting agents aid in displacing or balancing the slurry in a desired position along the wellbore. Preferred weighting agents include calcium carbonate, barite, galena and mixtures thereof. Calcium carbonate is preferred for use in production zones because of its solubility in an HCl solution. Other preferred additives include sulfate as an to increase rate of the phase transition reaction and strengthening agents such as fine silica, coarse silica and mixtures thereof.

The method of sealing a wellbore preferably comprises preparing the above-mentioned slurry, placing the slurry into a wellbore shaft and along the walls of at least a portion of the shaft and solidifying the slurry to form a seal along at least a portion of the wellbore shaft walls. The method may include the addition of optional additives, such as those identified above, to impart desired properties to the composition.

The composition has important physical properties which are not found in the prior art and which overcome problems with prior art drilling fluids and cements. One such property is that the composition undergoes a near immediate phase transition from a flowable slurry to a solid state upon reaching a composition temperature of approximately 60–68° C. This property is referred to herein as a "right-angle set" because of the characteristic sharply-angled curve (i.e., resembling a 90° or "right angle") formed by plotting composition viscosity versus setting time.

A second property is that the composition is non-invasive to surrounding earthen formations because the rapid set limits migration of the flowable slurry into such formations. This property of the composition is useful in avoiding damage from fluid or cement invasion into production zones. The non-invasive nature of the composition can be controlled and limited, however, by the use of inhibitors which prolong the composition set time at a given temperature thereby allowing the composition to be squeezed back further into the formation. Engineering the composition to migrate back into the formation is particularly useful where consolidation of unstable formations is required.

Yet another very important property of the invention is that there is a near-linear relationship between the time in which the phase transition reaction occurs and (a) the composition temperature at which the phase transition occurs, and (b) the inhibitor concentration at which the phase transition occurs. By "near-linear" it is meant that the relationship between the set time and the temperature or inhibitor concentration is generally linear with little variance from a straight line between the end points, although some variance is intended to fall within the scope of the invention. Stated another way, the time in which the phase transition occurs increases or decreases as a function of the temperature or inhibitor concentration. The relationship is not logarithmic in nature. These advantageous properties allow precise calculation of the time in which the composition will set in the wellbore under varying conditions of temperature and pressure. This predictability and controllability is essential in engineering down hole applications.

Another advantage is that the phase transition occurs predictably at high pressures typical of those found in down hole wellbore operations. The invention yields a solid state product with excellent compressive strength under these high pressure conditions.

A further advantage is that while the composition has excellent compressive strength and will support a drill string weight, it can be very easily drilled out with very little resistance allowing the drilling out on track in angled or build sections of the wellbore.

Further aspects and advantages of the invention will become apparent to those skilled in the art from a review of the following detailed description taken in conjunction with the examples and the appended claims. It should be noted that the invention is susceptible to embodiments in various forms. Therefore, the specific embodiments described hereinafter are provided with the understanding that the present disclosure is intended as illustrative and is not intended to limit the invention to the specific embodiments described herein.

DETAILED DESCRIPTION OF THE PREFERRED EMBODIMENTS

A composition and method for controlling wellbore fluid and gas invasion according to the invention includes a flowable slurry comprising about 70 to 30% by weight of a unique magnesium oxychloride material and about 70 to 30% by weight of water. The composition is typically a flowable slurry at composition temperatures below about 60° C. and sets to form a substantially solid mass upon reaching a composition temperature of about 60–68° C. Composition temperature refers to the temperature of the composition; said temperature can vary along different regions of the composition.

Preferably, the composition is prepared by first making a brine solution. Preferred forms of the brine comprise an admixture of magnesium chloride salt and water. Most highly preferred forms of the brine comprise about 50% by weight of $MgCl_2.6H_2O$ and 50% by weight of water, although other ratios may be used.

Preferably, the unique magnesium oxide powder of the invention is added to the brine to form a flowable slurry. The mixture of the magnesium chloride salt brine and magnesium oxide powder causes a reaction resulting in formation of the magnesium oxychloride slurry of the invention. Preferably, the slurry is a reaction product comprising an admixture of about 70 to 50% by weight of the brine and about 50 to 30% by weight of magnesium oxide powder. It is preferred that the magnesium oxide powder has a median particle size diameter of about 2–8μ and a bulk density of about 1–3.5 g/cm$^3$. One advantage of the preferred particle size distribution is that the slurry is sufficiently flowable to be pumped through the drill allowing the composition to be placed in the wellbore without removing the drill. Preferred forms of the slurry have a density of about 1.4–1.6 kg/L and a viscosity of about 18–30 cP. Densities can be increased at least up to about 2.2 kg/L by addition of one or more preferred weighting agents.

The magnesium oxide powder useful in practicing the invention is typically a product of Deepearth Solutions, Ltd., of Azerbaijan, Baku. Other useful sources of magnesium oxide powder include Baymag 96-200 available from Baymag, Calgary, Alberta, Canada and ISO9000 available from Fast Track Trust Inc, Illinois, USA., or mixtures of such compositions. It is anticipated that such magnesium oxide powder will be marketed by Deepearth Solutions under the trademark THERMATEK. It is further anticipated that suitable magnesium chloride salt for use in forming the inventive composition will be available from Deepearth Solutions under the trademark C-TEK. Magnesium chloride salt is also available from TBC Brine Company.

The composition base formulation, together with optional additives, is preferably prepared at the site of the wellbore. The composition may be prepared in a cement unit such as those manufactured by Halliburton, B. J. Hughes or Dowell Schlumberger. Typical cement units include a vessel and mixing apparatus. The constituents may be mixed in batches or in a continuous mixing operation. The slurry may then be pumped directly from the cement unit to the wellbore. Other suitable apparatus may be used to mix and pump the slurry to the wellbore. For example, the composition could be prepared in a tank of suitable volume, mixed with appropriate equipment and pumped to the wellbore with a triplex or duplex rig pump. It is anticipated that the composition will be prepared at ambient temperature and pressure. Cooler temperatures will delay the ramp time to the internal composition temperature at which the composition sets to form a solid state material.

Many optional constituents can be added to the base formulation to impart desired physical properties to the composition. The optional constituents may preferably include about 1 to 25% by weight of the overall composition of a filler. Fillers are used to modify the particle size distribution of the composition, for example to prevent packing of the preferred ultra-fine magnesium oxide particles. Undue packing can impair the flow of the slurry. Increasing the particle size distribution with fillers minimizes packing and contributes to flow. There are no particular limitations with respect to the particle size distribution of the fillers. The fillers may also be provided to add greater suspension properties for weight additives at lower weights, and can be selected to aid in packing off micro fractures in the wellbore. Use of the composition without fillers can be appropriate, for example, in "squeeze" applications where it is desirable to force the composition far back into the earthen formations surrounding the wellbore. Dolomite powder ($MgCaCO_3$) is a preferred filler for use in the invention because it does not impair acid solubility of the composition. A suitable dolomite powder is Dolomite 200 available from IMASCO International Minerals of Vancouver, Canada.

Inhibitors for delaying the time in which the phase transition occurs are particularly useful additives which may be added to the slurry. Such inhibitors allow the operator to control the set time of the composition based on the geothermal temperature at which the composition will be used. Increasing the weight percentage of the inhibitor will increase the time required for the composition to undergo the phase transition. The preferred inhibitor range is about 0.86 to 7.0% by weight of the magnesium oxide. Preferred inhibitors include sodium hexametaphosphate (technical grade granular), potassium magnesium phosphate hexahydrate and potassium magnesium hexametaphosphate. Mixtures of these preferred inhibitors may be used. The inhibitors are preferably water soluble and are preferably added to the fresh water before addition of the magnesium chloride salt to the water. The inhibitor can be added at other times, such as after formation of the brine. This mixing order is not preferred because the inhibitor is less soluble in the brine than in water alone.

It is anticipated that suitable sodium hexametaphosphate inhibitors will be available from Deepearth Solutions under the trademark R-TEK. Inhibitors including sodium hexametaphosphate, potassium magnesium phosphate hexahydrate and potassium magnesium hexametaphosphate are available from Van Waters & Rogers, Ltd. Calgary, Alberta, Canada or Rhone-Poulenc of Chicago, Ill.

Accelerating agents for increasing the rate at which the flowable slurry forms the solid mass may be incorporated into the slurry. Preferably the accelerating agent would comprise about 1 to 10% by weight of the slurry. Aluminum sulfate is a preferred accelerating agent. It is anticipated that such accelerator will be commercially available through Deepearth Solutions under the trademark A-TEK.

Optionally, at least one weighting agent in an amount from about 5 to 61% by weight of the overall composition may be included for controlling slurry mass and density. Control of slurry mass is an important manner of positioning the composition properly in the wellbore. Slurry mass and density must be sufficient to displace pressurized and dense fluids in the wellbore. Adjusting the composition mass and density also allows the composition to oppose and control tectonic earthen protrusions into the wellbore. Preferred weighting agents are selected from the group consisting of calcium carbonate, barite, galena. No particular particle size or ore grade is required. Mixtures of these preferred weighting agents may be used. Barite may be obtained from MI Drilling Fluids of Houston, Tex. Calcium carbonate is useful in operations where the composition must be removed from the wellbore because such material is over 99% soluble in an aqueous solution containing about 15% HCl.

At least one strengthening agent in an amount of about 1 to 50% by weight of the overall composition may be added to control composition cohesion and strength. Such agents perform much the same role as gravel or sand in conventional cements wherein the composition is strengthened by bonding of the cement to the sand or gravel. Preferred strengthening agents comprise fine silica, coarse silica and mixtures thereof It is anticipated that silica flour will be available from Deepearth Solutions, Ltd. under the trademark V-TEK.

The method of sealing a wellbore preferably comprises the steps of preparing the slurry composition as described above, placing the slurry into a wellbore shaft and along the walls of at least a portion of the shaft and solidifying the composition along at least a portion of the shaft walls forming a seal along at least a portion of the wellbore shaft walls. Although not preferred, the compositions for use in the method may be prepared in other mixing orders, for example, by admixing the magnesium oxide powder and water before addition of the magnesium chloride to the water. According to preferred forms of the method, the solidifying step comprises, at least in part, geothermal heating of the slurry to a slurry temperature of about 60–68° C. whereupon the heated slurry undergoes the phase transition from a flowable to a solid state. The method may include addition of the optional additives, such as those described above, to impart desired properties to the composition.

Without wishing to be bound by any particular theory, it is believed that the novel and advantageous results achievable with the invention are brought about because of the physical properties of the magnesium oxide constituents of the composition—the specific characteristics of which are not completely understood. What is known is that formation of the magnesium oxychloride slurry produces an exothermic reaction. The composition is heated as the exothermic reaction progresses. When the composition reaches a typical composition temperature of approximately 60–68° C. it rapidly undergoes the phase transition from flowable slurry to solid state. The composition can reach the approximate 60–68° C. temperature either as a result of the internal exothermic reaction or as a result of heat from an external source, such as geothermal heat. The ambient temperature affects the time in which the composition sets by affecting the ramp time to reach the temperature required for the phase transition reaction. The set time can be also be affected by the addition of inhibitors or accelerators. The set is a rapid right-angle set irrespective of the time required to reach the set temperature. The rapid set avoids or significantly limits formation of the gel state and related channelling problems.

The non-invasive nature of the composition is believed to be as a result of the more rapid heat build up and transfer which occurs along the periphery of the composition in the wellbore. As a result, the composition periphery reaches the required set temperature before the bulk of the composition and forms the solid state material along the face of the wellbore and within the immediate periphery of the surrounding earthen formation.

The non-invasive nature of the invention may be compared, by analogy, to pouring a pancake mix on a hotplate. If a container holding a flowable pancake mix were placed on a hotplate, the mix would start to set first along the container bottom where the container is in direct contact with the heated surface. If the pancake mix were emptied out onto the hotplate then the entire volume of the mix would spread out and set much faster.

In the case of the present invention, the wellbore is analogous to the container, the wellbore walls are analogous to the hotplate, while the slurry is analogous to the pancake mix. As the slurry spreads out along the wellbore walls, temperature transfer through a given volume of slurry increases rapidly. As a result, the slurry "locks up" or sets much faster along the surrounding wellbore walls than it does at the same temperature in the wellbore. This important characteristic is related to time and temperature only and is unaffected by hydrostatic pressure. It also means that at any given wellbore temperature the slurry will remain flowable in the wellbore for a known time to allow placement of the slurry and withdrawal of down hole tools and the like while at the same time forming a solid state material along the immediate wellbore walls and periphery.

The combination of the right-angle set and the near-linear relationship between the set time and (a) the temperature, and (b) the inhibitor concentration provides an engineered product allowing the operator to accurately determine the time in which the phase transition will occur. Essentially, this combination of properties allows the operator to determine the exact time at which the composition will flash set to form a solid state material. The set time can be shortened or extended as needed by addition of inhibitors and accelerating agents. This near-linearity in combination with the right-angle set is unique to magnesium oxychloride compositions of the invention and is not present in any known magnesium oxychloride cement or other prior art cement.

The composition has other important properties including the fact that solid state forms of the composition are soluble in an aqueous solution containing about 15% by weight of hydrochloric acid. This advantageous property permits the composition to be solubilized and removed from the wellbore. Because the composition is non-invasive and can be engineered so that it does not migrate significantly into the surrounding earthen formations, it is possible to contact and remove greater percentages of the cement with the acid solution.

In addition, the phase transition reaction occurs predictably at high pressures typical of those found in down hole wellbore operations. As will be demonstrated in the examples below, the right-angle set and near-linearity of the phase transition reaction occur at ambient pressure and at elevated pressures of about 10,000 psi. The solid state form of the composition has a high compressive strength observed to be in excess of 7000 psi which is an adequate compressive strength for use in wellbore operations. An important aspect of the invention is that the compressive strength increases very rapidly after the phase transition making the composition particularly useful in sealing pressurized formations.

The composition undergoes the advantageous phase transition even in the presence of contaminants typical of those found in wellbore operations. Contaminants such as seawater, emulsion field mud and laboratory prepared KCl/Glycol water-based mud do not adversely affect the setting properties of the invention.

It has been determined that solid state forms of the composition can be readily cut through by a drill bit. This property allows the drill to penetrate the composition without being "kicked out" of the wellbore and into soft adjacent earthen formations. This property makes the composition useful in lining the wellbore for drilling operations, particularly in wellbore build regions.

EXAMPLES AND DATA

The following examples are provided to further illustrate the invention and are not intended to limit the scope of the invention. Specifically, the following examples are provided to illustrate the composition, manufacture, physical characteristics and method of use of the inventive wellbore composition versus conventional compositions Exemplary Prior Art Compositions Three prior art magnesium oxychloride cement compositions are illustrated to demonstrate their lack of predictability with respect to their phase transition from flowable slurry to solid state. Each prior art composition showed different and uncontrollable set characteristics making them unsuitable for use as a material for controlling loss of wellbore fluids and gases.

A base formulation slurry was prepared for each of the prior art Examples 1–3. The base formulation comprised an unweighted slurry prepared according to the following mixing order:

| Prior Art Base Formulation Mixing Order | |
|---|---|
| Constituent | Amount |
| Fresh Water | 325 mL |
| Inhibitor (Sodium hexametaphosphate technical grade 2) | 12.3 g (Examples 2 & 3) or 20.5 g (Example 1) |
| Salt (Magnesium Chloride $MgCl_2.6H_2O$) | 325 g |
| Magnesium oxide powder, (Baymag 56, 96 or 58) | 410 g |

Each of the prior art base formulations was prepared by first admixing an inhibitor with fresh water followed by addition of magnesium chloride salt to form a brine solution. In Examples 2 and 3, 12.3 g of inhibitor was admixed with 325 mL of fresh water while in Example 1, 20.3 g of inhibitor was added to 325 mL of water. The inhibitor used was sodium hexametaphosphate inhibitor (technical grade 2) from Van Waters & Rogers, Ltd. Calgary, Alberta, Canada The brine solution was prepared by admixing 325 g of the magnesium chloride salt with the water and inhibitor for approximately 2 minutes. The admixing was discontinued when the salt was observed to be in solution. The magnesium chloride salt was obtained from TBC Brine Company.

Next, 410 g of conventional magnesium oxide powder was admixed and reacted with the brine for approximately 3 minutes to form each magnesium oxychloride base formulation slurry. The conventional magnesium oxide powder used in Examples 1–3 was manufactured by Baymag of Calgary, Alberta, Canada. The magnesium oxide powders in Examples 1–3 are identified by Baymag product codes 56, 96 and 58 respectively.

110 g of Dolomite 200 powder was admixed with the base formulation slurry. The slurry was observed to be flowable with a fluid density of about 13.6 ppg (1.63 SG).

In each prior art example, 600 mL of the slurry, including inhibitor, were placed in a steel consistometer cup. A full sized pressurized cement consistometer was used to evaluate the viscosity of the compositions at predetermined temperature and pressure levels. The consistometer determines the sample viscosity by measuring the resistance to movement of a rotatable paddle positioned in the sample. The consistometer was equipped with a digital temperature display which provided the internal temperature of the sample composition as measured by a probe positioned in the composition.

In each example, the cup containing the sample was placed into an oil bath in the consistometer chamber. The temperature of the oil bath and the chamber pressure were increased to evaluate the setting properties of the conventional compositions under simulated temperature and pressure conditions typical of those in a wellbore. In order to simulate these conditions, the consistometer temperature was set to ramp to 65° C. over a period of 50 minutes. Pressure was set to reach 10,000 psi over the same 50 minute period. The consistometer automatically adjusted the oil bath temperature and chamber pressure to compensate for any increase in composition temperature resulting from the exothermic reaction.

Figure 1:
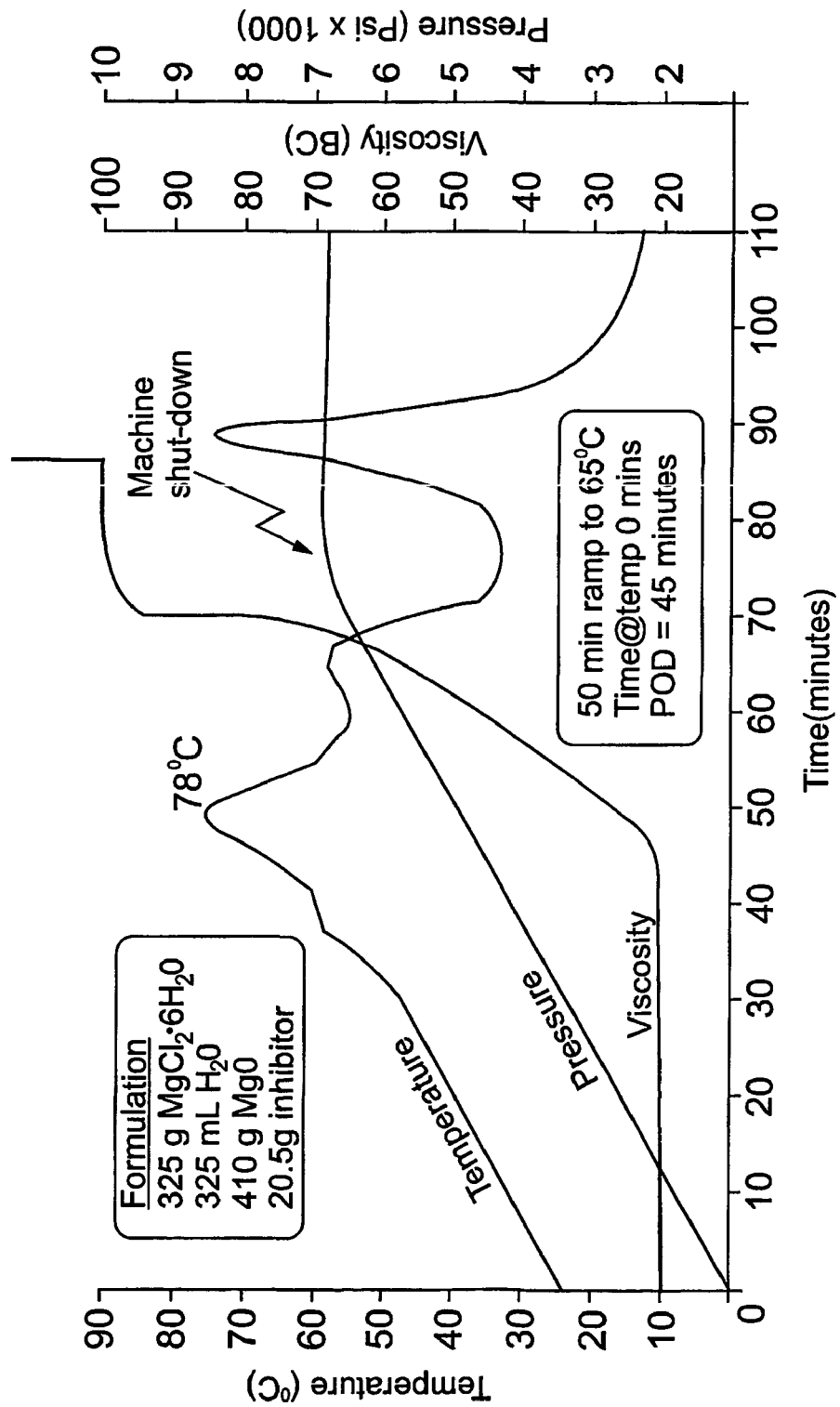
Figure 2:
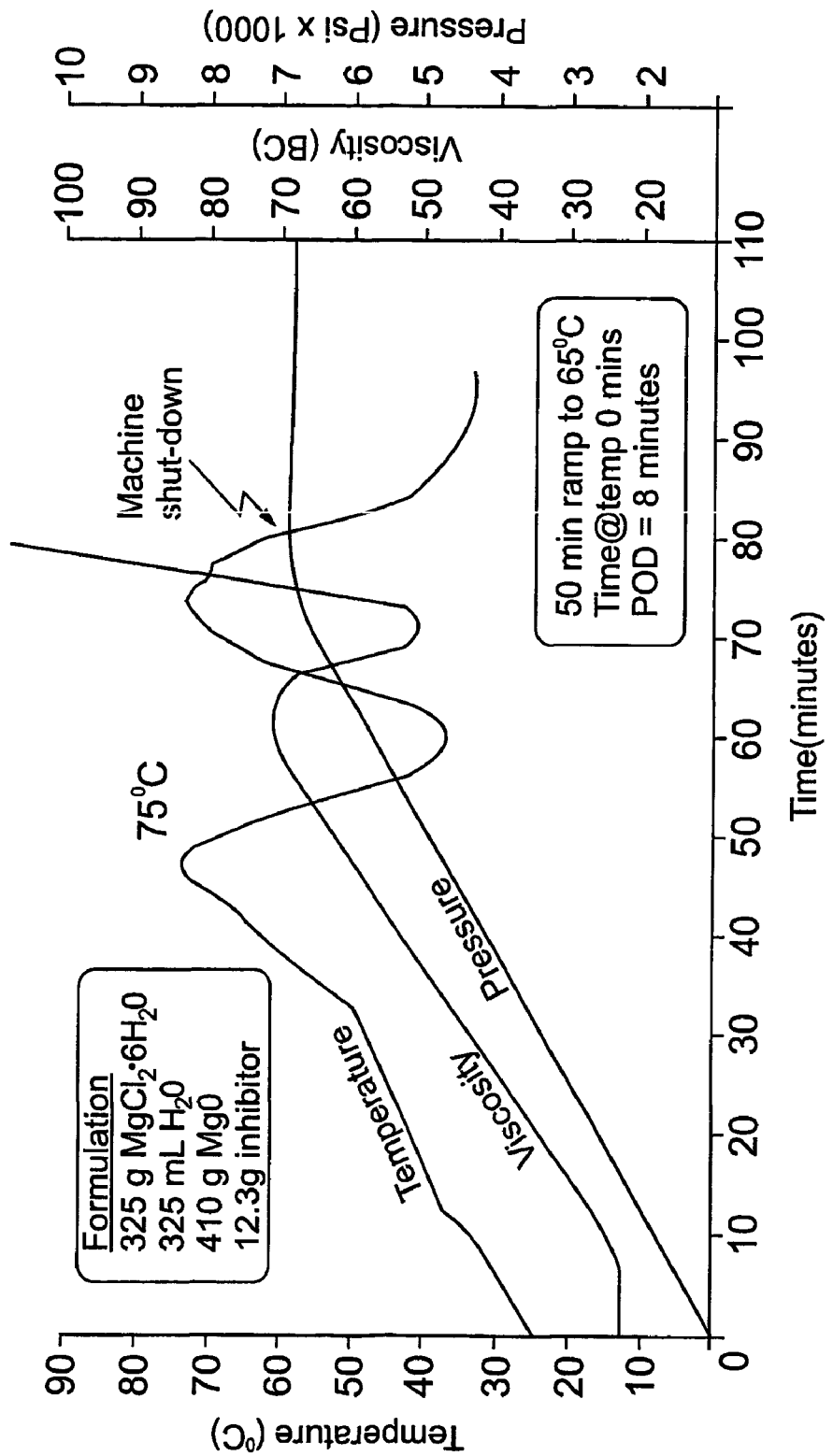
Figure 3:
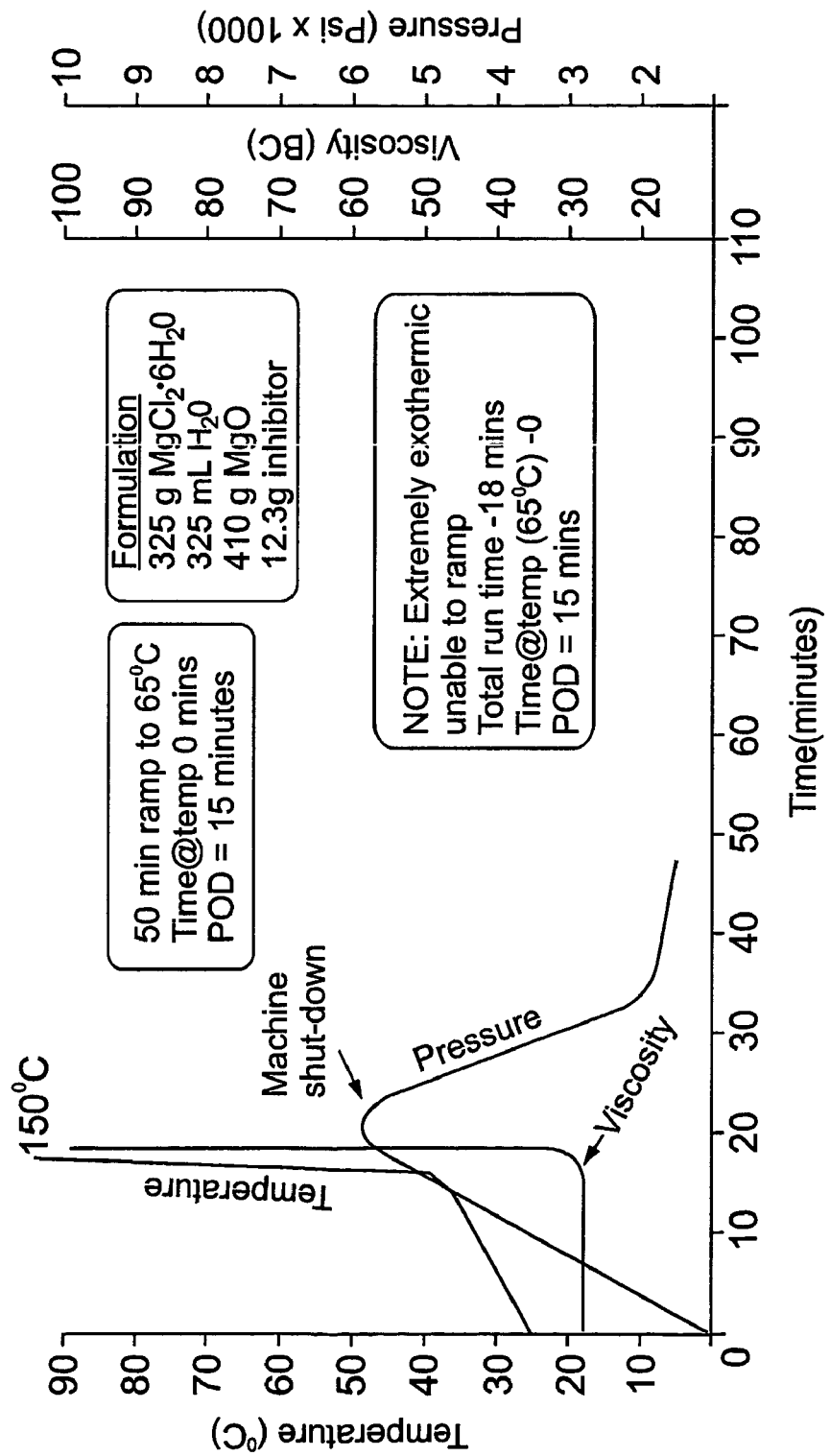

FIGS. 1–3 provide full oil bath temperature (in degrees Celsius), pressure (in pounds per square inch) and viscosity data (in Beardon Units) over each sample run. Tables 1–3 provide select data points. "POD" refers to the point of departure at which the sample compositions began to undergo the phase transition reaction. The data for Examples 1–3 are as follows:

Example 1

Prior Art Composition Based on Baymag 56 MgO Powder

TABLE 1

Setting Properties (65° C./5% Inhibitor)

| Time (Minutes) | Temperature (° C.) | Pressure (PSI) | Viscosity (Bc) |
|---|---|---|---|
| 0 | 24 | 0000 | 20 |
| 20 | 40 | 2600 | 20 |
| 45 | 72 | 4700 | 21-POD |
| 50 | 75 | 5000 | 28 |
| 60 | 57 | 5950 | 48 |
| 65 | 58 | 6300 | 58 |
| 70 | 43 | 6800 | 97 |
| 77 | 34 | 7000 | 102 |

Example 2

Prior Art Composition Based on Baymag 96 MgO Powder

TABLE 2

Setting Properties (65° C./3% Inhibitor)

| Time (Minutes) | Temperature (° C.) | Pressure (PSI) | Viscosity (Bc) |
|---|---|---|---|
| 0 | 25 | 0000 | 12 |
| 8 | 30 | 1100 | 13-POD |
| 10 | 32 | 1800 | 24 |
| 20 | 42 | 2500 | 34 |
| 30 | 49 | 3400 | 44 |
| 40 | 43 | 4200 | 54 |
| 50 | 53 | 5000 | 63 |
| 60 | 38 | 5800 | 72 |
| 70 | 69 | 6700 | 52 |
| 75 | 74 | 7100 | 66 |

Example 3

Prior Art Composition Based on Baymag 58 MgO Powder

TABLE 3

Setting Properties (65° C./3% Inhibitor)

| Time (Minutes) | Temperature (° C.) | Pressure (PSI) | Viscosity (Bc) |
|---|---|---|---|
| 0 | 25 | 0000 | 18 |
| 10 | 34 | 3800 | 18 |
| 15 | 38 | 4800 | 19-POD |
| 18 | 150 | 5800 | 30 |
| 18 | 150 | 5800 | 99 |

As is apparent from Tables 1–3 and FIGS. 1–3, the three conventional magnesium oxychloride compositions had distinctly different curves representing their transition from the flowable to solid state. In Examples 1 and 2, the phase transition occurred over an undesirable extended time period. During this time period, gel conditions would exist permitting formation of "channels" in the cement and allowing the escape of wellbore fluids and gases through those channels.

The reactions in all of the examples were powerfully exothermic as shown by the temperature spikes in FIGS. 1–3. The temperature reduction shown in FIGS. 1 and 2 represents an automatic reduction in the oil bath temperature by the consistometer in an effort to offset the composition temperature. In Example 3, the reaction was so powerfully exothermic that the consistometer was unable to reduce the oil bath temperature sufficiently to compensate for the increased composition temperature which exceeded 150° C. The data show that the reaction of Example was uncontrollable and occurred within only 18 minutes.

The solid state forms of Examples 1 and 2 were observed to have poor compressive strength essentially crumbling when pressed by a human hand and making them unsuitable for use in wellbore operations. While the compressive strength of the composition of Example 3 was greater, that composition was also useless in wellbore operations because of its uncontrollable phase transition reaction. There is no relationship between the time in which these compositions undergo the phase transition and the temperature at which the phase transition occurs. These magnesium oxychloride cement compositions are unacceptable for use as wellbore cements.

Exemplary Compositions of the Invention

Exemplary compositions of the invention were prepared and analyzed to determine their setting characteristics under different temperature conditions. The setting properties of the invention were also evaluated in combination with additives, such as viscosity modifiers, weighting agents and inhibitors. The effect of contaminants, such as found in typical wellbore drilling operations, were also evaluated. The solubility properties of certain solid state forms of the composition were also evaluated.

The data demonstrate, among other things, that, quite unlike the prior art, compositions of the invention have consistent and predictable setting characteristics at different temperatures and inhibitor concentrations. These properties make the instant invention particularly useful in the wellbore drilling industry because the setting time of the inventive compositions can be accurately calculated thereby permitting a greater level of control. These properties represent a significant advantage over prior art compositions wherein the set time either cannot be predictably determined or a gel state is formed between the fluid and set states.

Examples 4–11

Examples 4–11 demonstrate that the composition undergoes a predictable phase transition from a flowable slurry to a solid state upon reaching a composition temperature of about 60–68° C. The examples show the near-linear relationship between set time and temperature and between set time and inhibitor concentration.

A base formulation slurry was prepared for each of Examples 4–11. The base formulation comprised an unweighted slurry prepared according to the following mixing order:

| Base Formulation Mixing Order For Examples 4–11 | |
|---|---|
| Constituent | Amount |
| Inhibitor (R-Tek) | See Examples 4–11 |
| Fresh Water | 350 mL |
| Magnesium Chloride (C-Tek) | 350 g |
| Magnesium oxide powder (Thermatek) | 410 g |
| Dolomite (Dolomite 200) | 100 g |

Initially, R-Tek sodium hexametaphosphate inhibitor was added to 350 mL of fresh water. The weight percent of inhibitor varied in each example as shown in the following data tables. The inhibitor is an optional constituent. The inhibitor could be added at any time prior to use of the slurry although it is highly preferred that the inhibitor be added to the water to assure a uniform distribution of the inhibitor.

Next, a brine solution was prepared. The solution consisted of fresh water, including inhibitor, and C-Tek magnesium chloride salt. The brine solution was prepared by admixing 350 g of the magnesium chloride salt with 350 mL fresh water including inhibitor for approximately 2 minutes. The admixing was discontinued when the salt was observed to be in solution.

Next, 410 g of Thermatek magnesium oxide powder was admixed with the brine for approximately 3 minutes to form the base formulation slurry. The magnesium chloride salt brine and magnesium oxide powder reacted forming a magnesium oxychloride cement slurry. The Thermatek magnesium oxide powder had a median particle size distribution, by volume, of about 2–8 μ as shown in the Malvern Instruments particle size diameter volume distribution data provided in FIG. 14.

110 g of Dolomite 200 powder was admixed with the base formulation slurry. The slurry was observed to be flowable with a fluid density of about 13.6 ppg (1.63 SG).

As with the conventional compositions of Examples 1–3, the exemplary compositions of the invention in Examples 4–11 were evaluated to ascertain their setting properties, i.e., viscosity and phase transition, under simulated temperature and pressure conditions typical of those in a wellbore. A Chandler Engineering pressurized full sized cement consistometer was used for this evaluation. As in the case of the consistometer used to evaluate the conventional compositions, the Chandler consistometer determined the sample viscosity by measuring the resistance to movement of a rotatable paddle positioned in the sample. The consistometer was equipped with a digital temperature display which provided the internal temperature of the sample composition as measured by a probe positioned in the composition. Visual observations of the composition temperature were made in each example.

In each example, 600 mL of the slurry including inhibitor was placed in a consistometer cup. The cup was placed into an oil bath within the consistometer chamber.

For each sample run, the consistometer was set to linearly increase the composition temperature to a predetermined temperature over a 50 minute ramp time as shown in each example. The consistometer was further set to linearly increase the chamber pressure to 10,000 psi over the 50 minute ramp time. As with Examples 1–3, the consistometer had the capability to automatically adjust temperature and pressure to compensate for increases in the composition temperature resulting from the exothermic nature of the reaction produced by the magnesium oxychloride slurry.

FIGS. 4–11 provide full oil bath temperature (in degrees Celsius), pressure (in pounds per square inch) and viscosity data (in Beardon Units) for each sample run. Tables 4–11 provide select data points. Again, "POD" refers to the point of departure at which the sample compositions began to undergo the phase transition reaction.

Example 4

Figure 4:
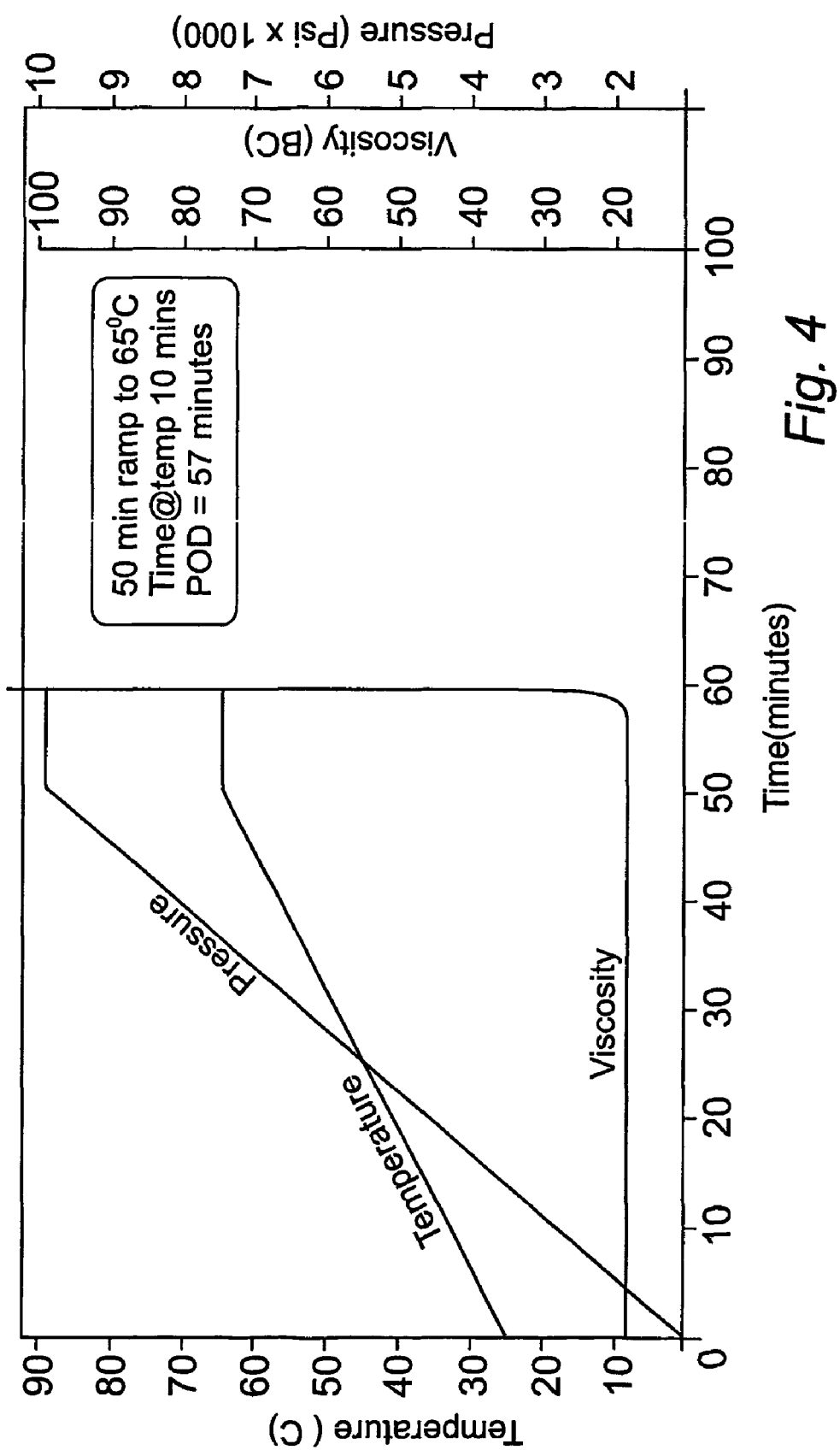

A specimen according to the base formulation was prepared. The specimen composition included three grams (0.86 weight % of the MgO) of R-Tek inhibitor (sodium hexametaphosphate). The specimen was heated in the consistometer to a temperature of 65° C. with a 50 minute ramp. Pressure was set to 10.000 psi. FIG. 4 provides the temperature, pressure and viscosity data while Table 4 provides select data points relating to the phase transition reaction.

TABLE 4

Setting Properties for Example 4 (65° C./0.86% Inhibitor)

| Time (Minutes) | Temperature (° C.) | Pressure (PSI) | Viscosity (Bc) |
|---|---|---|---|
| 0 | 20 | 2000 | 22 |
| 50 | 65 | 10,000 | 20 |
| 51–56 | 65 | 10,000 | 20 |
| 57 | 65 | 10,000 | 21-POD |
| 58 | 65 | 10,000 | 22 |
| 59 | 65 | 10,000 | 30 |
| 60 (measurement 1) | 65 | 10,000 | 40 |

TABLE 4-continued

Setting Properties for Example 4 (65° C./0.86% Inhibitor)

| Time (Minutes) | Temperature (° C.) | Pressure (PSI) | Viscosity (Bc) |
|---|---|---|---|
| 60 (measurement 2) | 65 | 10,000 | 70 |
| 60 (measurement 3) | 65 | 10,000 | 100 |

Example 4 shows that the composition began to undergo the phase transition from flowable slurry to solid (i.e., the POD) at about 57 minutes. The composition set to form a solid at 60 minutes. The temperature of the composition was observed to be between about 60–68° C. at this time. The data, and the corresponding graph (FIG. 4), demonstrate that the phase transition is sudden at an approximate composition temperature of about 60–68° C. The shape of the curve in FIG. 4 is indicative of the right-angle set characteristics of compositions of the invention.

Figure 15:
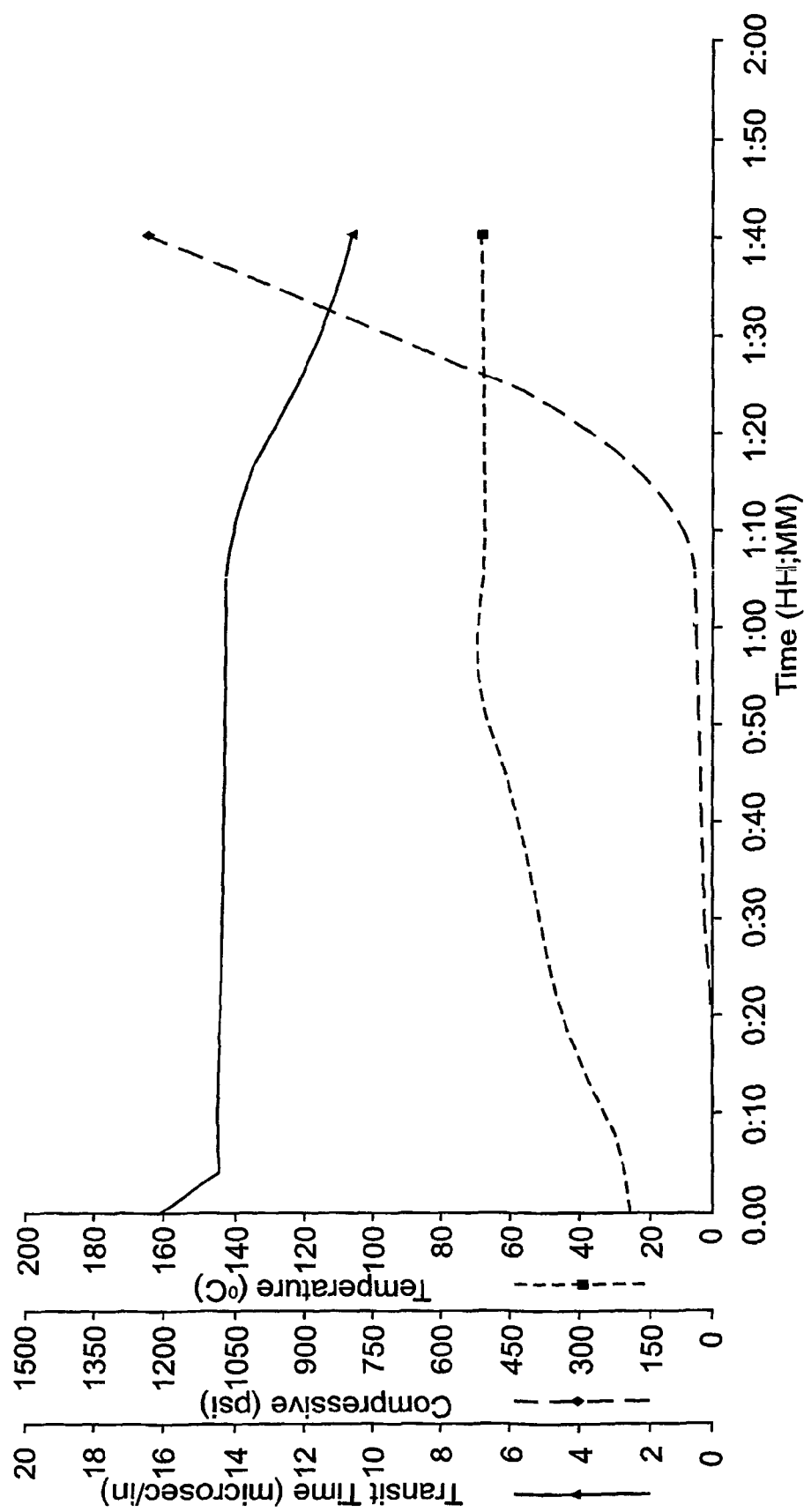

FIG. 15 presents compressive strength data for a composition according to Example 4. The data were generated by a Chandler pressurized, ultrasonic compressive strength tester programmed, as in Example 4, to heat the specimen to a temperature of 65° C. with a 50 minute ramp with pressure set to ramp to 10,000 psi. The data show that the composition achieved a compressive strength of about 1250 psi within 43 minutes following the POD (which occurred at 57 minutes) and that the compressive strength is increasing rapidly at that time. An important aspect of the invention is the rapid increase in compressive strength. As shown in FIG. 15, the compressive strength increased almost 1175 psi in the 40 minutes following the POD. This very rapid increase in compressive strength makes the composition particularly useful in sealing pressurized formations.

Example 5

Figure 5:
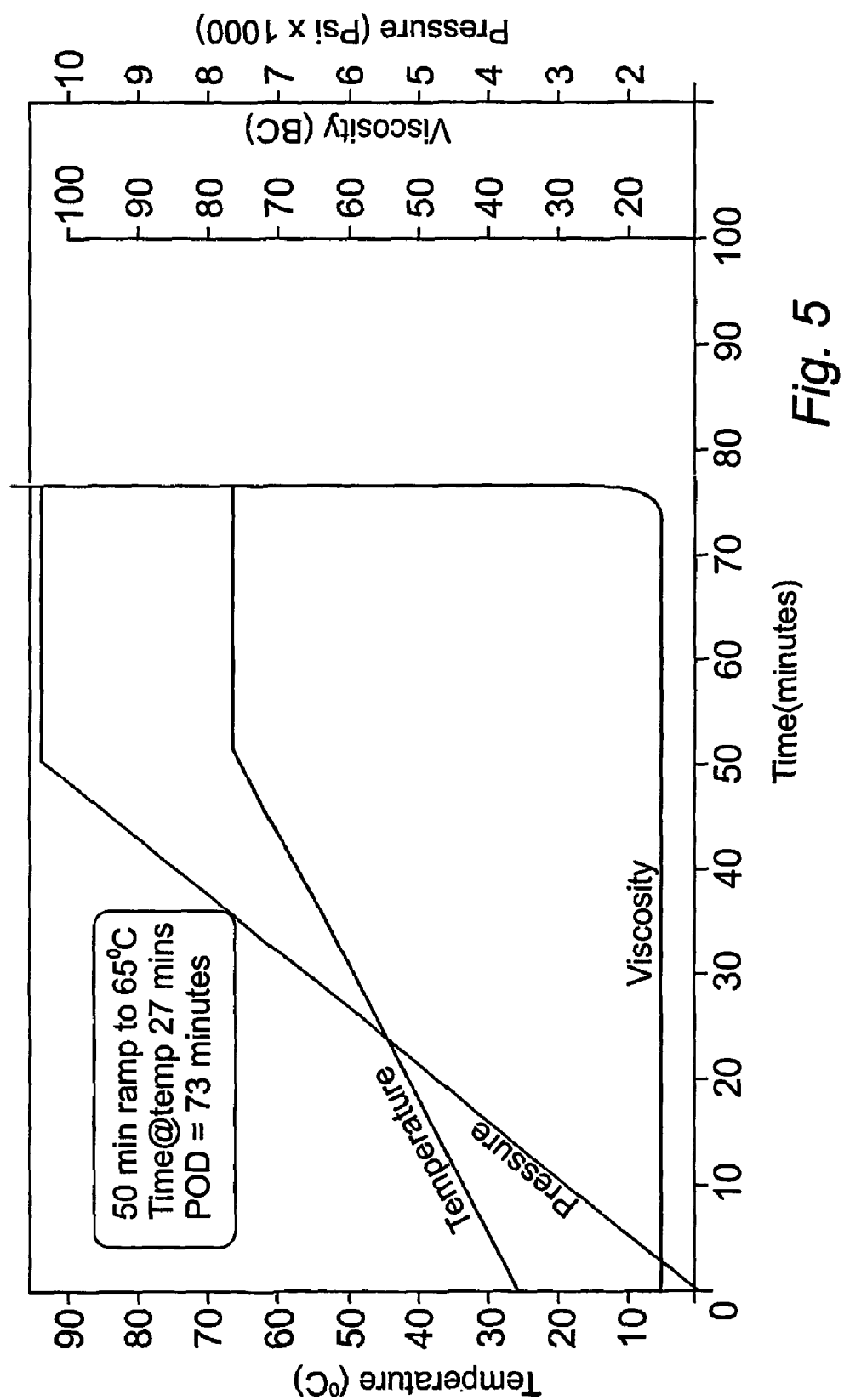

A second specimen according to the base formulation was prepared to evaluate the effect of increasing the weight percentage of inhibitor in the composition. Example 5 differed from Example 4 in that six grams (1.76 weight % of the MgO) of R-Tek were included in the composition. The specimen was heated to a temperature of 65° C. over a 50 minute time ramp. Pressure was set to linearly increase to 10,000 psi over 50 minutes. FIG. 5 and Table 5 provide the temperature, pressure and viscosity measurements for the example.

TABLE 5

Setting Properties for Example 5 (65° C./1.74% Inhibitor)

| Time (Minutes) | Temperature (° C.) | Pressure (PSI) | Viscosity (Bc) |
|---|---|---|---|
| 0 | <65 | 6,000 | 12 |
| 50 | 65 | 10,000 | 7 |
| 70 | 65 | 10,000 | 7 |
| 73 | 65 | 10,000 | 12-POD |
| 74 | 65 | 10,000 | 13 |
| 75 | 65 | 10,000 | 14 |
| 76 (measurement 1) | 65 | 10,000 | 30 |
| 76 (measurement 2) | 65 | 10,000 | 40 |
| 77 (measurement 1) | 65 | 10,000 | 70 |
| 77 (measurement 2) | 65 | 10,000 | 100 |

Example 5 demonstrates the same phase transition and right-angle set as the composition of Example 4 except that the phase transition occurs about 16 minutes later than does the phase transition in Example 4. The composition temperature was observed to be 60–68° C. at POD. The difference in timing of the phase transition is explained by the greater concentration of inhibitor present in the composition of Example 5.

Example 6

Figure 6:
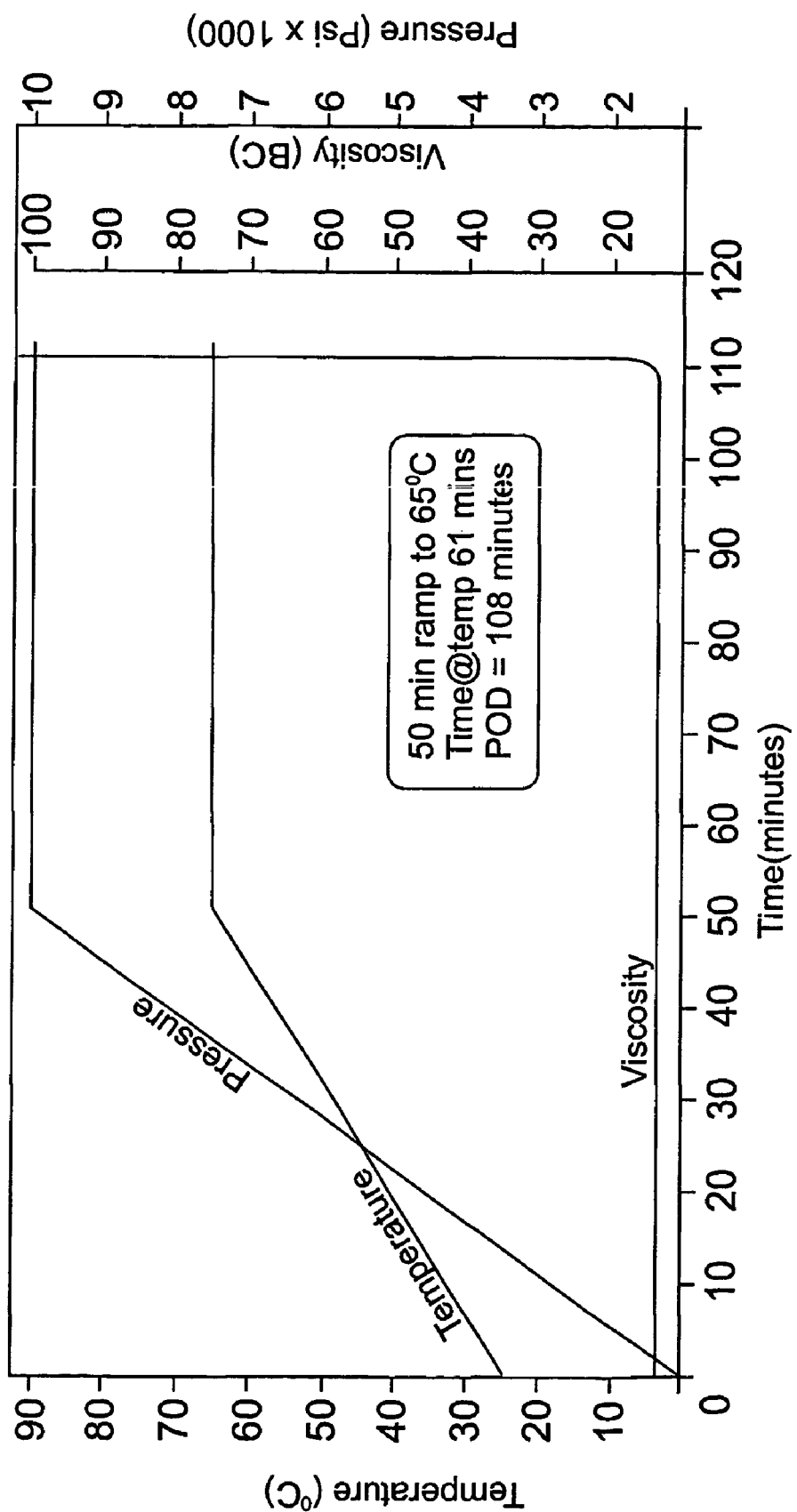

A third specimen according to the base formulation was prepared to evaluate the effect of further increasing the weight percentage of inhibitor in the composition. The composition of Example 6 differed from the compositions of Examples 4 and 5 in that twelve grams (3.48 weight % of the MgO) of R-Tek were added to the composition. The specimen was heated to a temperature of 65° C. with a 50 minute ramp up. Consistometer pressure was set to 10,000 psi. FIG. 6 and Table 6 provide the temperature, pressure and viscosity data for the sample run.

TABLE 6

Setting Properties for Example 6 (65° C./3.48% Inhibitor)

| Time (Minutes) | Temperature (° C.) | Pressure (PSI) | Viscosity (Bc) |
|---|---|---|---|
| 0–49 | <65 | <1000 | 6 |
| 50–107 | 65 | 10,000 | 6 |
| 108 | 65 | 10,000 | 7-POD |
| 109 | 65 | 10,000 | 8 |
| 110 (measurement 1) | 65 | 10,000 | 30 |
| 110 (measurement 2) | 65 | 10,000 | 40 |
| 111 (measurement 1) | 65 | 10,000 | 70 |
| 111 (measurement 2) | 65 | 10,000 | 100 |

Example 6 demonstrates that the composition began to undergo the phase transition at about 108 minutes. The composition was essentially solid at 111 minutes. The data in Table 6 and FIG. 6 demonstrate that the phase transition of the composition is rapid. The phase transition again occurred at an observed composition temperature of about 60–68° C. The shape of the curve in FIG. 6 is indicative of the right-angle set characteristic of compositions of the invention. The phase transition delay is again due to the increased concentration of the inhibitor versus that in the compositions of Examples 4 and 5.

Example 7

The purpose of Example 7 was to evaluate the effect of increased temperature on the phase transition properties of the composition of Example 6. A specimen was formulated in the same manner as the specimen of Example 6 including the addition of twelve grams (3.48 weight % of the MgO) of R-Tek. Unlike Example 6, the specimen was heated to a temperature of 80° C. over a 50 minute ramp time. Consistometer pressure was set to increase to 10,000 psi over the 50 minute ramp. The temperature, pressure and viscosity data for the sample run are presented in FIG. 7 and Table 7.

TABLE 7

Setting Properties (80° C./3.48% Inhibitor)

| Time (Minutes) | Temperature (° C.) | Pressure (PSI) | Viscosity (Bc) |
|---|---|---|---|
| 0–49 | <80 | <10,000 | 4 |
| 50–77 | 80 | 10,000 | 4 |

TABLE 7-continued

Setting Properties (80° C./3.48% Inhibitor)

| Time (Minutes) | Temperature (° C.) | Pressure (PSI) | Viscosity (Bc) |
| --- | --- | --- | --- |
| 78 | 80 | 10,000 | 4-POD |
| 79 | 80 | 10,000 | 10 |
| 80 | 80 | 10,000 | 30 |
| 81 (measurement 1) | 80 | 10,000 | 40 |
| 81 (measurement 2) | 80 | 10,000 | 70 |
| 81 (measurement 3) | 80 | 10,000 | 100 |

Figure 7:
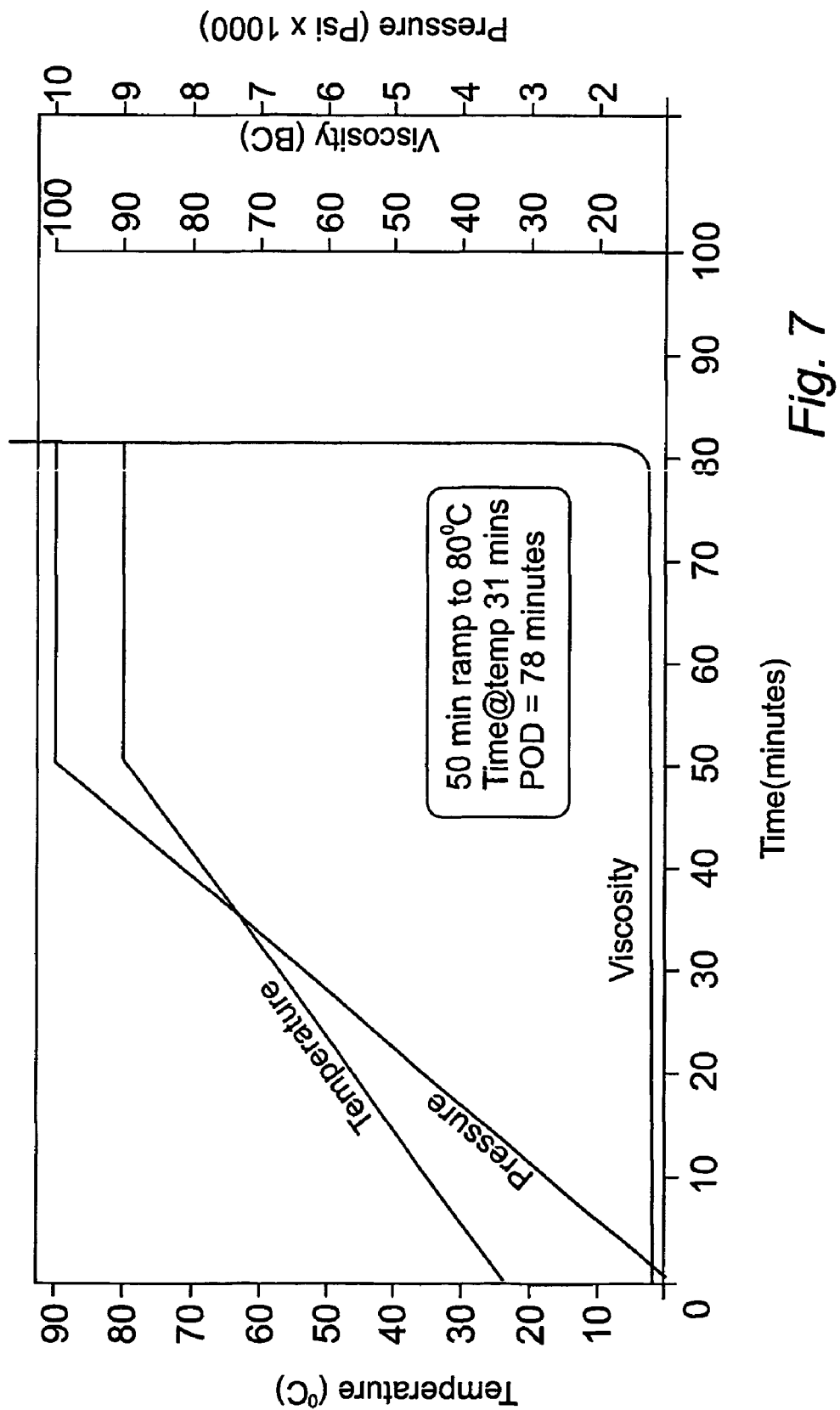
Figure 8:
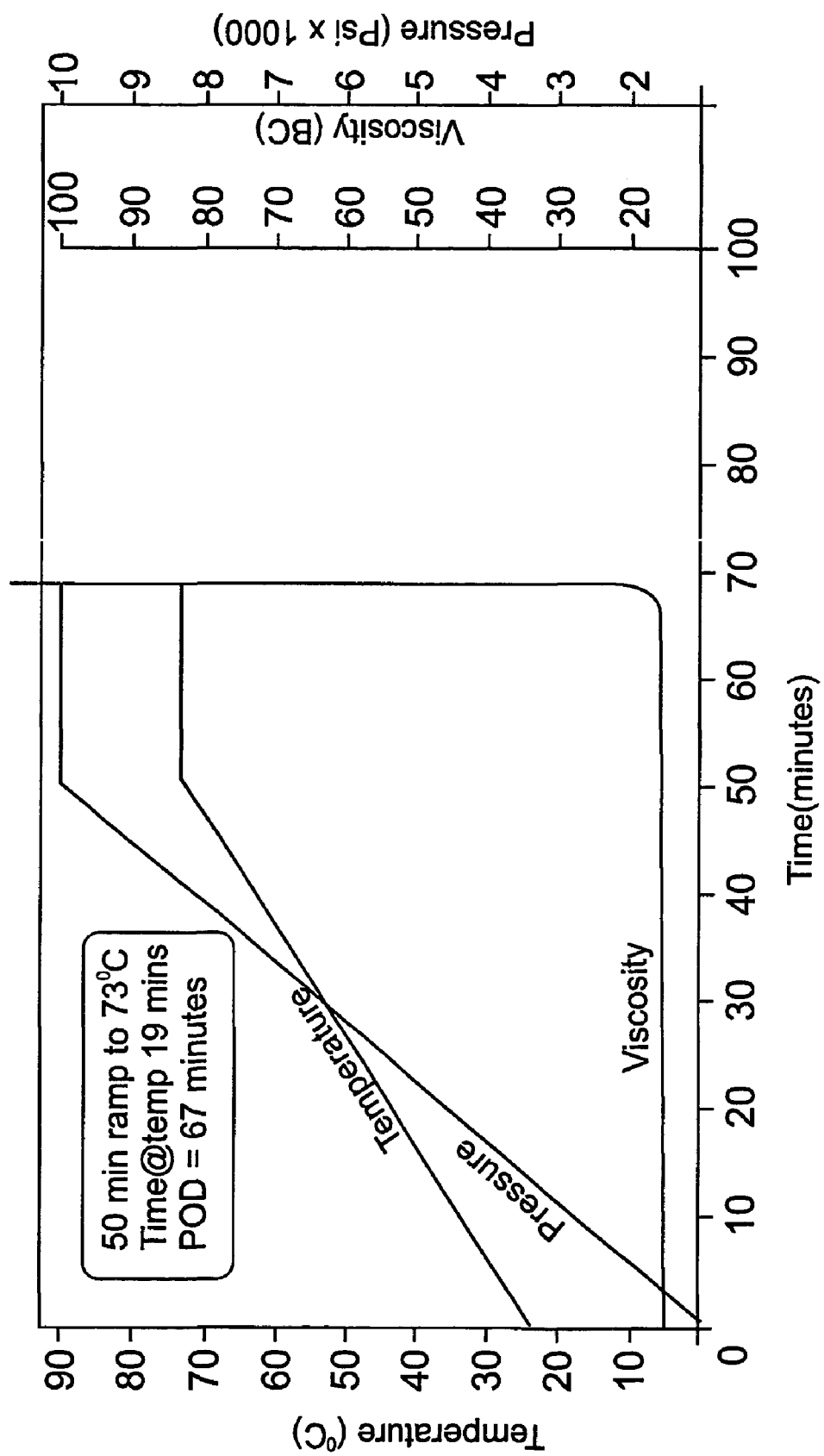

Example 7 demonstrates that the phase transition occurs more rapidly at higher ambient temperatures. The phase transition of Example 7 began to occur 30 minutes earlier than the phase transition of Example 6. The observed composition temperature at 78 minutes was between about 60–68° C. The surrounding temperature, therefore, affects the rate at which the composition reaches the approximate 60–68° C. composition temperature required for the phase transition to occur. The phase transition occurs more rapidly at elevated temperatures. The right-angle set is seen in FIG. 7.

Example 8

Example 8 includes an evaluation of a composition according to Example 5, but heated to a slightly greater temperature. The specimen of Example 8 was prepared according to the base formulation of the invention. As in Example 5, six grams (1.74 weight % of the MgO) of R-Tek were included in the composition. The oil bath was heated to a temperature of 73° C. with a 50 minute time ramp. Consistometer pressure was set to 10,000 psi. Temperature, pressure and viscosity data are presented in FIG. 8 and Table 8.

TABLE 8

Setting Properties for Example 8 (73° C./1.74% Inhibitor)

| Time (Minutes) | Temperature (° C.) | Pressure (PSI) | Viscosity (Bc) |
| --- | --- | --- | --- |
| 0–49 | <73 | <10,000 | 10 |
| 50 | 73 | 10,000 | 11 |
| 55 | 73 | 10,000 | 11 |
| 60 | 73 | 10,000 | 11 |
| 67 | 73 | 10,000 | 11-POD |
| 68 | 73 | 10,000 | 20 |
| 69 | 73 | 10,000 | 100 |

Example 8 demonstrates that the composition began to undergo the phase transition at about 67 minutes. The composition formed a solid at about 69 minutes. The characteristic right-angle set is again evident in FIG. 8. The observed composition temperature at 67–69 minutes was between about 60–68° C. As expected, less time was required for the composition to set because of the elevated oil bath temperature versus that in Example 5. The data in Table 8 and FIG. 8 demonstrate that the phase transition of the composition is rapid and again occurs at an approximate observed composition temperature of about 60–68° C.

Example 9

Figure 9:
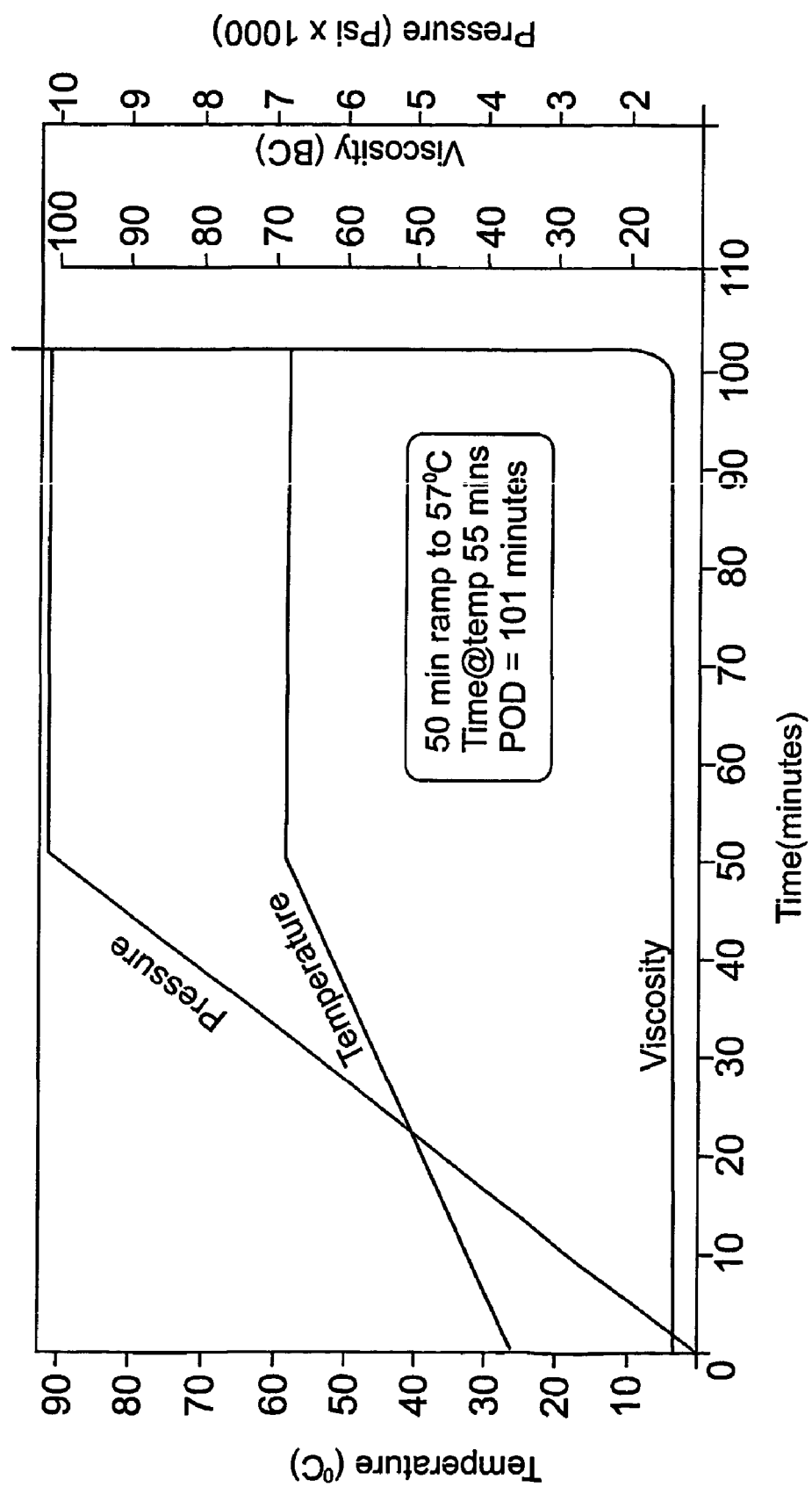

Example 9 was conducted to evaluate the effect of reduced temperature on the set time of a composition having the same inhibitor concentration as in Examples 5 and 8. In Example 9, a specimen was prepared in the same manner as in Examples 5 and 8. Again, six grams (1.74 weight % of the MgO) of R-Tek were included in the formulation. In Example 9, the oil bath containing the specimen was heated to a temperature of only 57° C. with a 50 minute ramp up. Consistometer pressure was set at 10,000 psi. Table 9 and FIG. 9 provide the temperature, pressure and viscosity measurements for the sample run.

TABLE 9

Setting Properties for Example 9 (57° C./1.74% Inhibitor)

| Time (Minutes) | Temperature (° C.) | Pressure (PSI) | Viscosity (Bc) |
| --- | --- | --- | --- |
| 0–49 | <57 | <10,000 | 6 |
| 50–100 | 57 | 10,000 | 7 |
| 101 | 57 | 10,000 | 7-POD |
| 102 | 57 | 10,000 | 30 |
| 103 | 57 | 10,000 | 40 |
| 104 | 57 | 10,000 | 70 |
| 105 | 57 | 10,000 | 100 |

As expected, the phase transition in the composition of Example 9 occurred at a time subsequent to the phase transition of Examples 5 and 8.

The observed composition temperature at 101 minutes was between about 60–68° C. The reason for this difference is that a greater amount of time was needed for the composition to reach the required temperature needed for the transition to occur. The characteristic right-angle set is evident once again in FIG. 9.

Example 10

Figure 10:
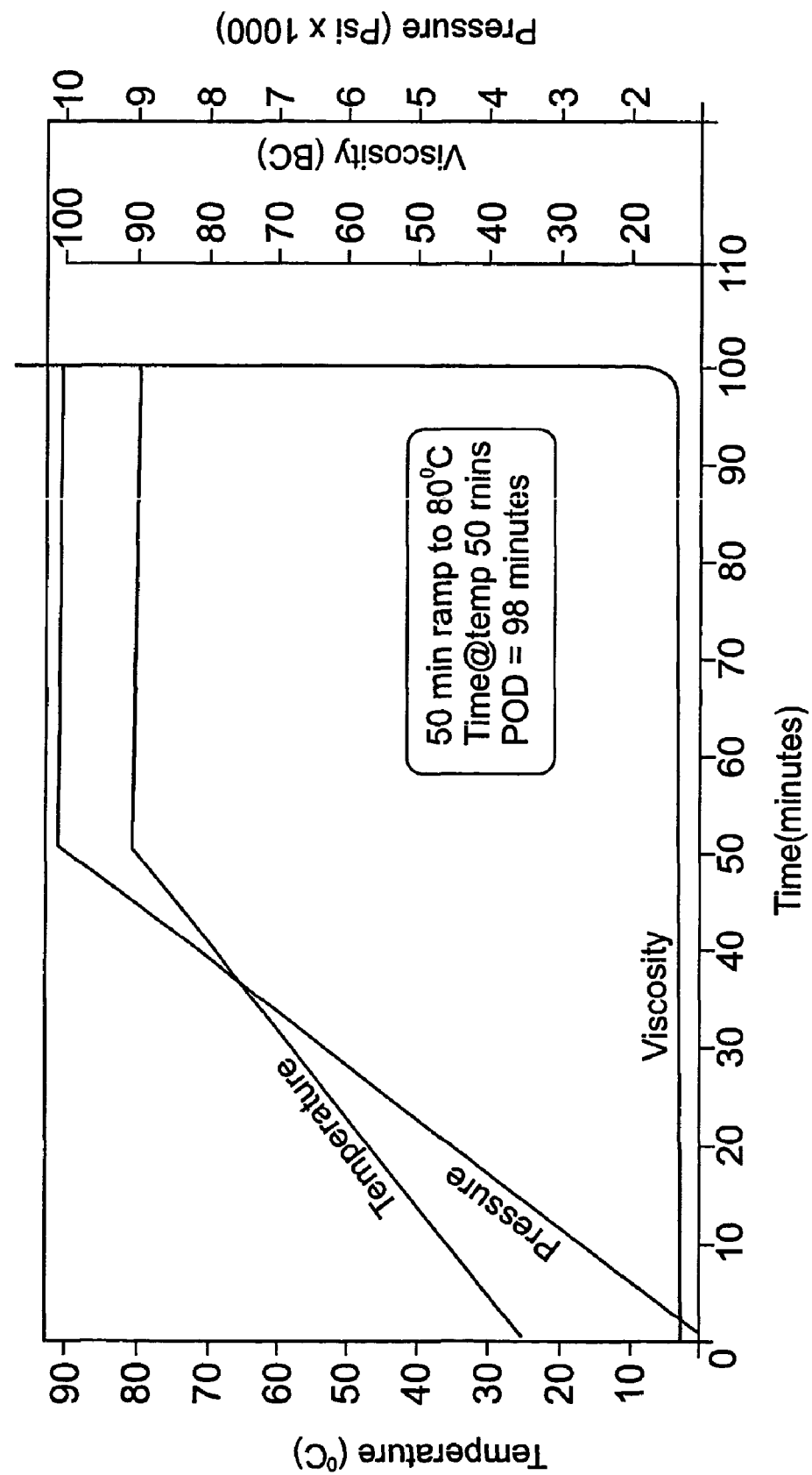

In Example 10 the effect of increased temperature and increased inhibitor concentration was evaluated. A specimen according to the base formulation was again prepared. Five percent by weight of the MgO of R-Tek inhibitor were included in the composition. In this example, the oil bath and specimen were heated to a temperature of 80° C. with a 50 minute time ramp. Example 10 is the essentially the same test as that in Example 7 but with an additional 1.26% inhibitor. Consistometer pressure was set to 10,000 psi. Table 10 and FIG. 10 provide the oil bath temperature, pressure and composition viscosity data for the sample run.

TABLE 10

Setting Properties for Example 10 (80° C./5% Inhibitor)

| Time (Minutes) | Temperature (° C.) | Pressure (PSI) | Viscosity (Bc) |
| --- | --- | --- | --- |
| 0–49 | <80 | <10,000 | 3 |
| 50 | 80 | 10,000 | 4 |
| 98 | 80 | 10,000 | 4-POD |
| 98 | 80 | 10,000 | 20 |
| 100 | 80 | 10,000 | 100 |

As shown in Table 10 and FIG. 10, the phase transition occurred approximately 20 minutes later than that of Example 7. The POD occurred at an observed temperature of about 60–68° C. The increased amount of inhibitor is believed to be responsible for the increased amount of time required for the set to occur. FIG. 10 again demonstrates the characteristic right-angle set which is present irrespective of the increased inhibitor concentration.

Example 11

Figure 11:
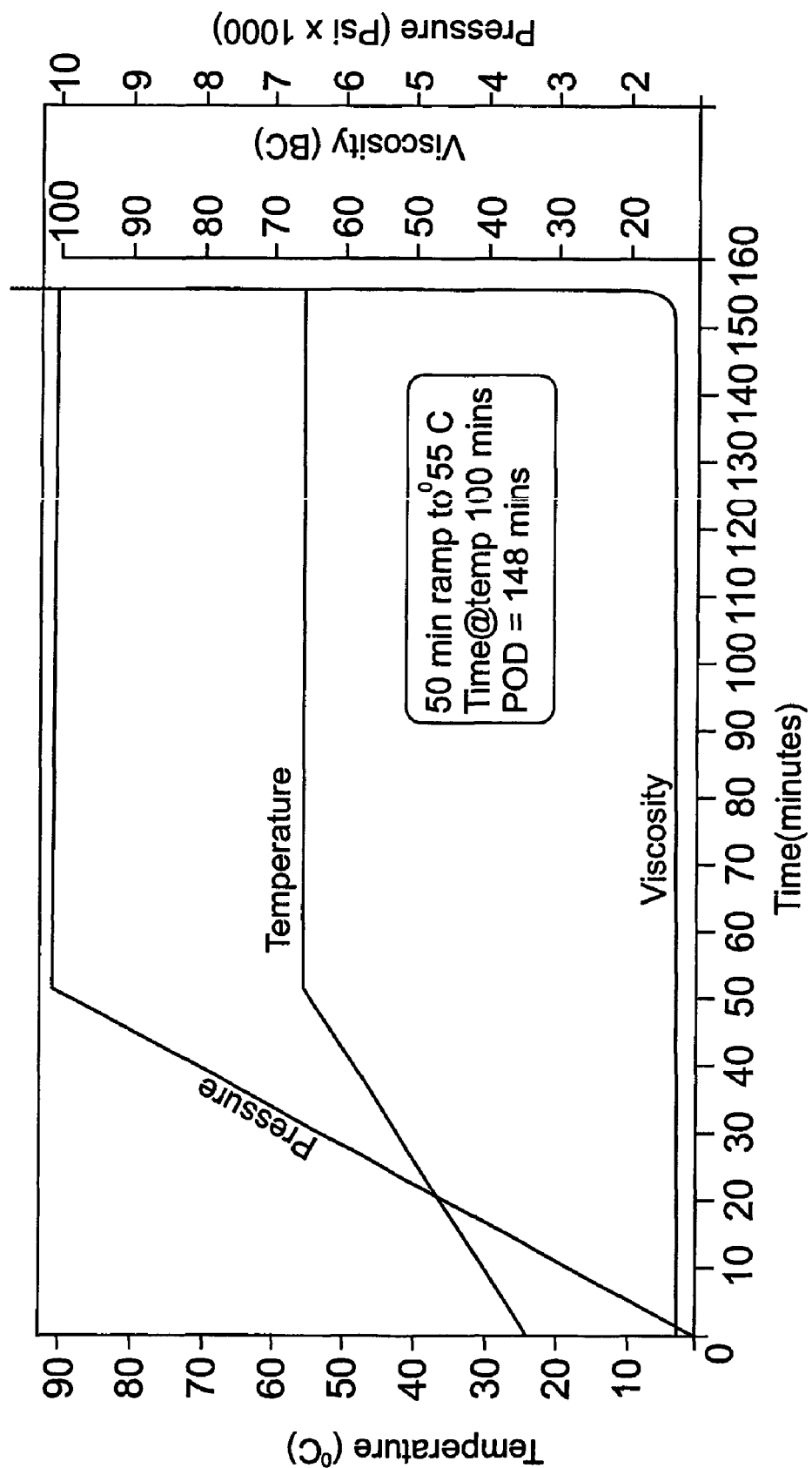

Example 11 was prepared to evaluate the effect of a decreased temperature on the phase transition properties of a composition like that of Example 6. Again, a specimen was prepared according to the base formulation. As in Example 6, twelve grams (3.48 weight % of the MgO) of R-Tek were added to the composition. The specimen was heated to a temperature of 55° C. (10° C. less than in Example 6) with a 50 minute time ramp. FIG. 11 provides the oil bath temperature, pressure and composition viscosity data for the sample run while Table 11 provides select data points.

TABLE 11

Setting Properties for Example 11 (55° C./3.48% Inhibitor)

| Time (Minutes) | Temperature (° C.) | Pressure (PSI) | Viscosity (Bc) |
|---|---|---|---|
| 0–49 | <55 | <10,000 | 7 |
| 50–147 | 55 | 10,000 | 8 |
| 148 | 55 | 10,000 | 8-POD |
| 149–154 | 55 | 10,000 | 22 |
| 155 (Measurement 1) | 55 | 10,000 | 30 |
| 155 (Measurement 2) | 55 | 10,000 | 40 |
| 156 | 55 | 10,000 | 70 |
| 157 | 55 | 10,000 | 100 |

As expected, a greater amount of time, 148 minutes, was required for the composition to reach the POD versus that of Example 6 which required only 108 minutes to reach the POD. The composition temperature at 148 minutes was observed to be about 60–68° C. The 40 minute time difference in reaching the POD may be explained by the lower oil bath temperature provided in Example 11 which increases the amount of time required for the exothermic reaction to heat the composition to the temperature required for the phase transition to occur. The right-angle set is again evident in FIG. 11 despite the fact that more time was required for the set to occur.

Figure 12:
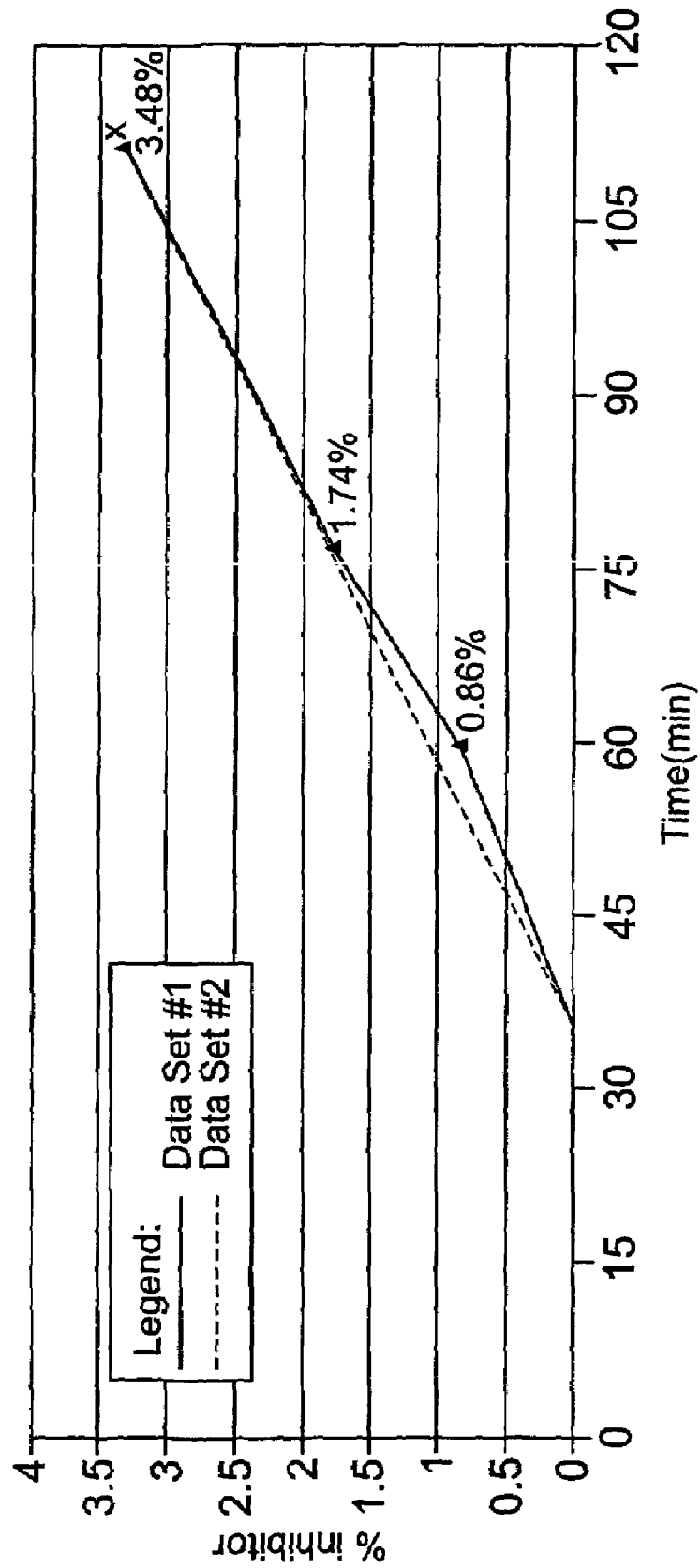
Figure 13:
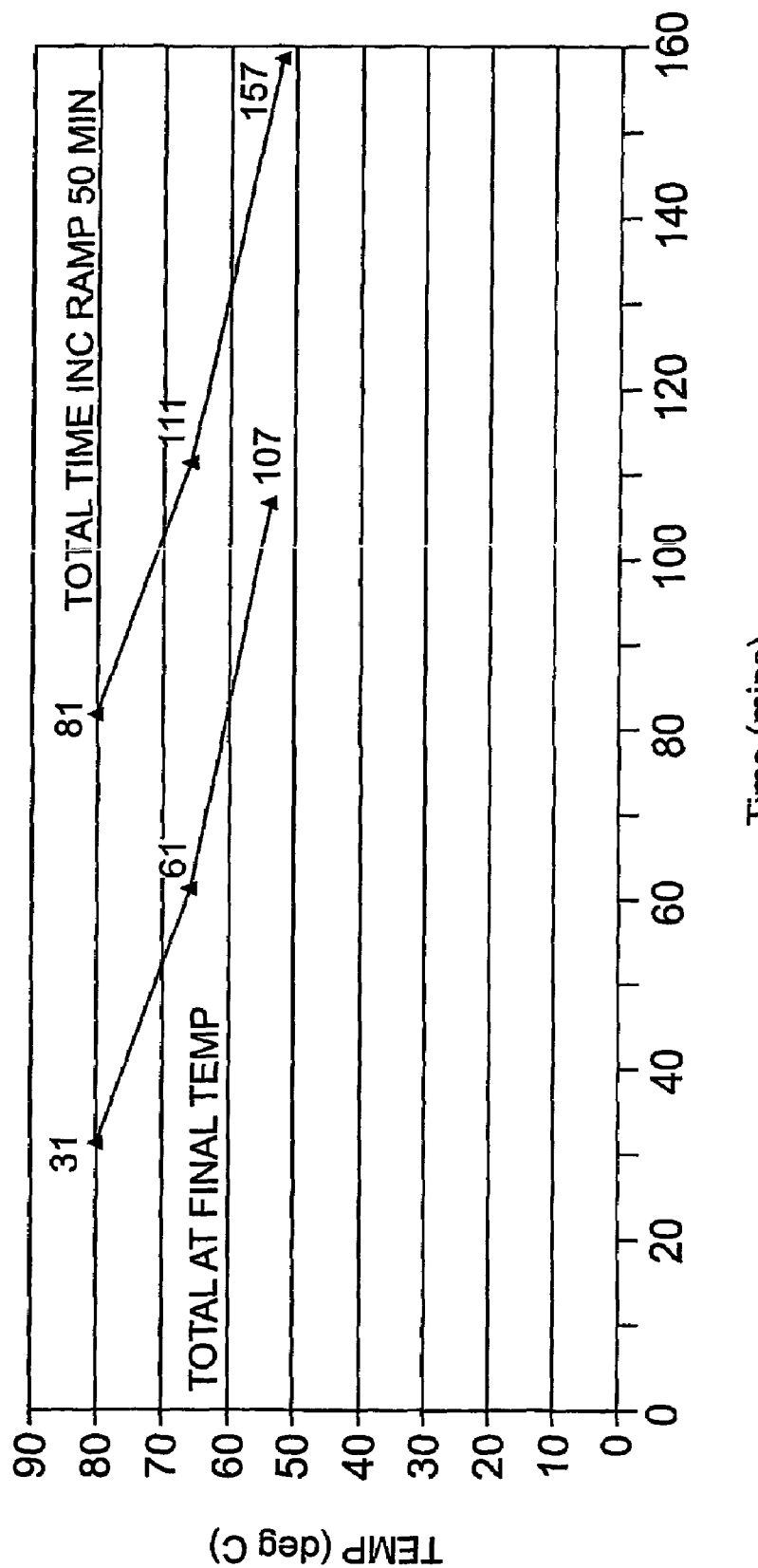

FIGS. 12 and 13 demonstrate that the phase transition of the inventive composition occurs in a predictable manner and in a manner permitting accurate calculation of the time required for the composition to set. FIG. 12 is a graph showing the setting time required for the compositions of Examples 4–6 to reach a viscosity of 100 $B_c$. Two data sets are presented in FIG. 12. The solid line in FIG. 12 is identified as "data set #1" and is based on the setting properties data of Tables 4–6 and FIGS. 4–6. The setting properties of the compositions of Examples 4–6 were also obtained at an earlier time under the same conditions and protocol to those in Examples 4–6. That information is identified as "data set #2" and is represented by the dashed line in FIG. 12.

The near-identical nature of the data in data sets 1 and 2 in FIG. 12 show that the composition has consistent setting properties. The data of FIG. 12 also show a near-linear relationship between the time required for each exemplary composition to reach 100 $B_c$ at varying inhibitor concentrations when the temperature is held constant. These data demonstrate that the phase transition and right-angle set occur in a predictable manner at varying inhibitor concentrations. The data points need not be completely linear but must not reflect an exponential relationship between the time needed for the reaction and the inhibitor concentration at the selected temperature.

FIG. 13 is a graph showing the setting times required for the compositions of Examples 6, 7 and 11 to reach a viscosity of 100 $B_c$. The compositions of Examples 6, 7 and 11 each included identical inhibitor concentrations (3.48 wt. % of the MgO) but were heated by the consistometer to temperatures of 65, 80 and 55° C. respectively. The right-most data set represents the total amount of time required for each composition to reach a viscosity of 100 $B_c$ including the 50 minute ramp to the respective final temperature. The left-most data set represents the total amount of time that each composition was held at the respective final temperature before reaching a viscosity of 100 $B_c$. This data set excludes the 50 minutes required to reach the final temperature.

The data clearly show a near-linear relationship between the time required for each exemplary composition to reach a viscosity of 100 $B_c$ at varying temperatures when the inhibitor concentration is held constant. These data demonstrate that the phase transition and right-angle set occur in a predictable manner at varying temperatures. Again, the invention does not require that the time/temperature relationship is fully linear but an exponential relationship between the time needed for the composition to set and the temperature must be avoided.

Taken together, FIGS. 12 and 13 show that the set time is predictably extended by increasing the inhibitor concentration and/or decreasing the ambient temperature. Importantly, the data show that the set time can be determined based on the ambient temperature and/or inhibitor concentration thereby providing operators of down hole wellbore operations with a previously unknown degree of control over the cement.

Examples 12–13

Examples 12–13 further demonstrate that the inventive Thermatek compositions, including other additives like viscosity modifiers, inhibitors and weighting agents, undergo a predictable phase transition from a flowable slurry to a solid state at varying temperatures and inhibitor concentrations. In addition, the data demonstrate that the compositions set predictably in the presence of contaminants typically encountered in actual drilling operations.

A Thermatek base formulation slurry was prepared. Example 12 is the Thermatek base composition. Example 13 is the Thermatek base formulation together with a weighting agent as described below. The base formulation comprising Example 12 and used for Example 13 comprised an unweighted slurry prepared according to the following mixing order:

| Thermatek Base Formulation Mixing Order for Examples 12–13 | |
|---|---|
| Constituent | Amount |
| Magnesium oxide powder (Thermatek) | 238.76 g |
| Dolomite powder (Dolomite 200) | 58.24 g |
| Fresh Water | 204 mL |
| Magnesium Chloride (R-Tek) | 204 mL |

Thermatek magnesium oxide powder and the dolomite powder were blended in the approximate 4.1:1 ratio set forth in the base formulation mixing

| | |
|---|---|
| Dolomite powder (Dolomite 200) | 58.24 g |
| Fresh Water | 204 mL |
| Magnesium Chloride (R-Tek) | 204 mL |

Thermatek magnesium oxide powder and the dolomite powder were blended in the approximate 4.1:1 ratio set forth in the base formulation mixing order table. The dolomite is not a required constituent of the invention. A brine solution consisting of fresh water and C-Tek magnesium chloride salt was prepared by admixing 204 g of the magnesium chloride salt with 204 mL fresh water for approximately 2 minutes. The admixing was discontinued when the salt was observed to be in solution.

Next, 297 g of the magnesium oxide/dolomite powder blend was admixed with the brine for approximately 2 minutes to form the base formulation slurry. The magnesium oxide powder used in Examples 12–13 had a median particle size distribution, by volume, of about 2–8 μ. The slurry was observed to be flowable with a fluid density of about 13.6 P.G. (1.63 SG).

Example 13 consisted of the base formulation and a barite weighting agent provided to increase the mass and density of the composition. In the field, a weighting agent, such as barite, would be used to aid displacement of the composition down the wellbore and to hydrostatically balance the slurry in the wellbore. The following table shows the mixing order of the slurry including the weighting agent.

| Example 13 - Weighted Thermatek Base Formulation Mixing Order | |
|---|---|
| Constituent | Amount |
| Thermatek Base formulation slurry | 311 mL |
| Barite (MI Drilling Fluids) | 164 g |

The physical properties of Example 12 (unweighted Thermatek slurry) and Example 13 (weighted base formulation slurry) were taken using a Fann Drilling Fluid Viscometer and are presented in Table 12.

TABLE 12

Rheological Properties

| Property | Example 12 - Unweighted Thermatek Slurry | Example 13 - Weighted Thermatek Slurry |
|---|---|---|
| Density, P.G./SG | 13.6/1.63 | 16.0/1.92 |
| Rheology Temp., °F./°C. | 88/31.1 | 82/27.7 |
| 600 rpm | 52 | 118 |
| 300 rpm | 28 | 65 |
| 200 rpm | 19 | 47 |
| 100 rpm | 11 | 28 |
| 6 rpm | 3 | 10 |
| 3 rpm | 2 | 8 |
| PV, cP | 24 | 53 |
| YP, lb/100 ft$^2$ | 4 | 12 |
| 10-Second Gel Strength, lb/100 ft$^2$ | 3 | 10 |
| 10-Minute Gel Strength, lb/100 ft$^2$ | 9 | 22 |

In each example, 350 mL samples of the unweighted and weighted slurries were placed in cups and subjected to static ageing tests. The samples were examined at 15 minute intervals at ambient pressure and at the indicated temperatures to evaluate the setting properties of the sample compositions. There was no attempt to provide a linear temperature/pressure ramp as in Examples 1–11.

Example 12

The unweighted Thermatek slurry composition of Example 12 was subjected to the static setting time tests at 100° F. (38° C.), 150° F. (66° C.) and 200° F. (93° C.) all at ambient pressure. After the rheological properties were determined, as reported in Table 12 above, the samples of the unweighted slurry samples were placed in three different ovens. Each sample was checked visually every 15 minutes and observations made as to the physical properties of the compositions as set forth in the following Tables 13–15.

TABLE 13

Example 12 - Unweighted Thermatek Slurry Sample Heated at 100° F. (38° C.)

| Time (Minutes) | Observations |
|---|---|
| 15 | sample fluid; flowed easily when swirled by hand. |
| 30 | still fluid in centre; slightly thicker at edges. |
| 45 | smaller fluid centre; more thickening at edges. |
| 60 | firm throughout; custard-like consistency. |
| 75 | firmer; inserted spatula falls to side. |
| 90 | very firm; stiff taffy-like consistency; inserted spatula stands alone. |
| 105 | very firm to hard; slight penetration with a spatula; tacky on the surface. |
| 120 | set hard; spatula will not penetrate the surface. |

TABLE 14

Example 12 - Unweighted Thermatek Slurry Sample Heated at 150° F. (66° C.)

| Time (Minutes) | Observations |
|---|---|
| 15 | sample fluid; flowed easily when swirled by hand. |
| 30 | slight fluid centre; thick at edges and bottom. |
| 45 | firm throughout; custard to taffy-like consistency. |
| 60 | very firm; stiff taffy-like consistency; inserted spatula stands alone. |
| 75 | very firm to hard; slight penetration with a spatula; tacky on the surface. |
| 90 | set hard; spatula will not penetrate the surface. |

TABLE 15

Example 12 - Unweighted Thermatek Slurry Sample Heated at 209° F. (93° C.)

| Time (Minutes) | Observations |
|---|---|
| 15 | slight fluid centre; thick at edges and bottom. |
| 30 | very firm; stiff taffy-like consistency; inserted spatula stands alone. |
| 45 | set hard; spatula will not penetrate the surface. |

Example 13

The weighted Thermatek slurry sample of Example 13 was placed in an oven at 150° F. (66° C.) at ambient pressure. The setting time of the weighted slurry was determined as set forth in Table 16.

TABLE 16

Example 12 - Weighted Thermatek Slurry Sample Heated at 150° F. (66° C.)

| Time (Minutes) | Observations |
|---|---|
| 15 | slight fluid centre; thick at edges and bottom. |
| 30 | firm throughout, custard to taffy-like consistency. |
| 45 | very firm; stiff taffy-like consistency; inserted spatula stands alone. |
| 60 | set hard; surface slightly tacky, but spatula will not penetrate the sample. |

The data show that the setting times of the compositions of Examples 12 and 13 were similar at a given temperature and at ambient pressure, with the weighted sample setting time slightly shorter (60 minutes) than the unweighted sample (75 to 90 minutes). In each case, the compositions underwent a rapid phase transition characteristic of the right-angle set of the compositions of the invention.

Examples 14–15

The unweighted and weighted Thermatek slurry compositions of Examples 12 and 13 were next exposed to three different contaminant fluids typical of contaminants found in drilling operations. The purpose of the experiments was to evaluate the effect of the contaminants on the setting properties of both exemplary compositions.

The contaminants used in Examples 14–15 consisted of one of: (1) seawater, (2) NOVATEC brand invert emulsion field mud and (3) laboratory prepared KCl/Glycol water-based mud with 35 ppb KCl and 4% by volume Glycol at 12.5 ppg (1.5 SG). The Theological properties of the three contaminants were taken using a Fann Drilling Fluid Viscometer and are presented in Table 17.

TABLE 17

Contaminant Rheological Properties

| Contaminant | Seawater | NOVATEC | KCl/Glycol |
|---|---|---|---|
| Density, ppg/SG | 8.5/1.02 | 14.74/1.77 | 12.5/1.50 |
| Rheology Temp., ° F./° C. | ** | 150/66 | 120/49 |
| 600 rpm | ** | 62 | 96 |
| 300 rpm | ** | 35 | 65 |
| 200 rpm | ** | 26 | 51 |
| 100 rpm | ** | 16 | 32 |
| 6 rpm | ** | 5 | 6 |
| 3 rpm | ** | 4 | 4 |
| PV, cP | ** | 27 | 31 |
| YP, lb/100 ft$^2$ | ** | 8 | 34 |
| 10-Second Gel Strength, lb/100 ft$^2$ | ** | 8 | 4 |
| 10-Minute Gel Strength, lb/100 ft$^2$ | ** | 12 | 10 |

For purposes of Examples 14 and 15, each of the contaminant fluids was added to separate samples of the unweighted Thermatek slurry of Example 12 and weighted Thermatek slurry of Example 13 at 0.25 bbl equivalents of contaminant to 0.75 bbl equivalent of the slurry. Rheological properties of the composition of Example 14 (unweighted slurry and contaminants) and Example 15 (weighted slurry and contaminants) were determined using a Fann Drilling Fluid Viscometer prior to static setting time testing. The properties were as reported in Tables 18 and 19 below.

TABLE 18

Rheological Properties of Example 14 - Unweighted Thermatek Slurry of Example 12 with Contamination

| Contaminant | Seawater | NOVATEC | KCl/Glycol |
|---|---|---|---|
| Density, P.G./SG | 12.3/1.48 | 13.9/1.67 | 13.5/1.62 |
| Rheology Temp., ° F./° C. | 82/28 | 79/26 | 81/27 |
| 600 rpm | 20 | 54 | 98 |
| 300 rpm | 11 | 27 | 52 |
| 200 rpm | 7 | 21 | 36 |
| 100 rpm | 4 | 11 | 21 |
| 6 rpm | 2 | 3 | 3 |
| 3 rpm | 1 | 2 | 2 |
| PV, cP | 9 | 27 | 46 |
| YP, lb/100 ft$^2$ | 2 | 0 | 6 |
| 10-Second Gel Strength, lb/100 ft$^2$ | 2 | 4 | 3 |
| 10-Minute Gel Strength, lb/100 ft$^2$ | 7 | 10 | 21 |

TABLE 19

Rheological Properties of Example 15 - Weighted Thermatek Slurry of Example 13 with Contamination

| Contaminant | Seawater | NOVATEC | KCl/Glycol |
|---|---|---|---|
| Density, P.G./SG | 14.1/1.69 | 15.7/1.88 | 15.1/1.81 |
| Rheology Temp., ° F./° C. | 75/23.9 | 79/26.1 | 81/27.2 |
| 600 rpm | 34 | 182 | 170 |
| 300 rpm | 29 | 115 | 120 |
| 200 rpm | 14 | 90 | 106 |
| 100 rpm | 9 | 61 | 85 |
| 6 rpm | 5 | 30 | 41 |
| 3 rpm | 4 | 29 | 28 |
| PV, cP | 5 | 67 | 50 |
| YP, lb/100 ft$^2$ | 24 | 48 | 70 |
| 10-Second Gel Strength, lb/100 ft$^2$ | 7 | 47 | 25 |
| 10-Minute Gel Strength, lb/100 ft$^2$ | 18 | 80 | 67 |

In each example, 350 mL samples of the contaminated unweighted and weighted slurries were placed in cups and subjected to static ageing tests. The samples were examined at 15 minute intervals at ambient pressure and at the indicated temperatures to evaluate the setting properties of the sample compositions. There was no attempt to provide a linear temperature/pressure ramp as in Examples 1–11.

Example 14

Samples of each unweighted, Thermatek slurry sample of Example 12, with the respective contaminant, were placed in ovens at 150° F. (66° C.). The setting time of each contaminated slurry was determined as set forth in Tables 20–22.

TABLE 20

Example 14 - Unweighted Thermatek Slurry of Example 12 with Seawater Contamination Heated at 150° F. (66° C.)

| Time (Minutes) | Observations |
|---|---|
| 15 | slight fluid centre; thick at edges and bottom. |
| 30 | firm throughout; custard to taffy-like consistency. |
| 45 | very firm; stiff taffy-like consistency; inserted spatula stands alone. |
| 50 | set hard; spatula will not penetrate the surface. |

TABLE 21

Example 14 - Unweighted Thermatek Slurry of Example 12 with NOVATEC Contamination Heated at 150° F. (66° C.)

| Time (Minutes) | Observations |
|---|---|
| 15 | slight fluid centre; thick at edges and bottom. |
| 30 | firm throughout; custard to taffy-like consistency. |
| 45 | very firm; stiff taffy-like consistency; inserted spatula stands alone. |
| 50 | set hard; spatula will not penetrate the surface. |

TABLE 22

Example 14 - Unweighted Thermatek Slurry of Example 12 with KCl/Glycol Water-Based Mud Contamination Heated at 150° F. (66° C.)

| Time (Minutes) | Observations |
|---|---|
| 15 | fluid centre; thick at edges and bottom. |
| 30 | thicker throughout; custard to taffy-like consistency. |
| 45 | firm to stiff taffy-like edges and bottom; soft centre; inserted spatula stands alone. |
| 60 | very firm throughout; inserted spatula stands alone. |
| 75 | set hard; spatula will not penetrate the surface. |

The data show that contamination does not adversely affect the phase transition of the unweighted Thermatek slurry. The seawater and NOVATEC contaminated slurries actually set more rapidly than the uncontaminated sample while the KCl/Glycol Water-Based Mud Contamination sample set at approximately the same time as the uncontaminated sample.

Example 15

Samples of each weighted, Thermatek slurry sample of Example 13, with the respective contaminant, were placed in ovens at 150° F. (66° C.). The setting time of each contaminated slurry was determined as set forth in Tables 23–25. Although the Theological properties of the contaminated and weighted Thermatek slurry samples were elevated, the fluids all appeared to retain their pumpability.

TABLE 23

Example 15 - Weighted Slurry of Example 13 with Seawater Contamination Heated at 150° F. (66° C.)

| Time (Minutes) | Observations |
|---|---|
| 15 | Slight fluid centre; thick at edges and bottom. |
| 30 | Soft, grading to firm throughout; custard to taffy-like consistency. |
| 45 | Firm; stiff taffy-like consistency; inserted spatula stands alone. |
| 60 | Very firm grading to hard; difficult to penetrate with spatula. |
| 75 | set hard; tacky on the surface, but spatula will not penetrate |

TABLE 24

Example 15 - Weighted Slurry of Example 13 with NOVATEC Contamination Heated at 150° F. (66° C.)

| Time (Minutes) | Observations |
|---|---|
| 15 | Soft centre; thick at edges and bottom. |
| 30 | Soft, grading to firm throughout; custard to taffy-like consistency. |
| 45 | very firm; stiff taffy-like consistency; inserted spatula stands alone. |
| 60 | very firm grading to hard; difficult to penetrate with spatula. |
| 75 | Set hard; tacky on the surface, but spatula will not penetrate. |

TABLE 25

Example 15 - Weighted Slurry of Example 13 with KCl/Glycol Water-Base Mud Contamination Heated at 150° F. (66° C.)

| Time (Minutes) | Observations |
|---|---|
| 15 | Soft centre; thick at edges and bottom. |
| 30 | Thicker throughout; custard to taffy-like consistency. |
| 45 | Very firm; spatula penetrates and stands alone. |
| 60 | Very firm to hard throughout; spatula still penetrated |
| 75 | Set hard; tacky on the surface; spatula will not penetrate. |

The data show that contamination does not adversely affect the phase transition of the weighted Thermatek slurry. The set times of the contaminated, weighted slurries were similar. Such set times were also comparable to the set time of the uncontaminated weighted slurry as shown in Table 16.

Examples 16–17

R-Tek inhibitor was added to the unweighted and weighted Thermatek slurry compositions of Examples 12 and 13 to evaluate the effect of the inhibitor on the setting properties of the compositions. The inhibitor was admixed with the fresh water before addition of the other constituents. 11.94 g of inhibitor (5% by weight of inhibitor based solely on the magnesium oxide) was added to each of the exemplary compositions. The rheological properties of Examples 16 and 17 were determined using a Fann Drilling Fluid Viscometer as set forth in Table 26 prior to static setting time testing.

TABLE 26

Rheological Properties of Examples 16 and 17 - Thermatek Slurries of Examples 12 and 13 with Inhibitor

| | Example 16 - Unweighted Slurry with R-Tek Inhibitor | Example 17 - Weighted Slurry with R-Tek Inhibitor |
|---|---|---|
| Density, P.G/SG | 13.6/1.63 | 16.0/1.92 |
| Rheology Temp., ° F./° C. | 75/23.9 | 75/23.9 |
| 600 rpm | 58 | 126 |
| 300 rpm | 32 | 72 |
| 200 rpm | 23 | 53 |
| 100 rpm | 13 | 33 |
| 6 rpm | 4 | 11 |
| 3 rpm | 3 | 10 |

TABLE 26-continued

Rheological Properties of Examples 16 and 17 - Thermatek Slurries of Examples 12 and 13 with Inhibitor

|  | Example 16 - Unweighted Slurry with R-Tek Inhibitor | Example 17 - Weighted Slurry with R-Tek Inhibitor |
| --- | --- | --- |
| PV/cP | 26 | 54 |
| YP, lb/100 ft$^2$ | 6 | 18 |
| 10-Second Gel Strength, lb/100 ft$^2$ | 8 | 15 |
| 10-Minute Gel Strength, lb/100 ft$^2$ | 16 | 30 |

The compositions of Examples 16–17 were placed in an oven at 150° F. (66° C.) under static conditions and ambient pressure. There was no attempt to provide a linear temperature/pressure ramp as in Examples 1–11. Viscosity observations were made every 30 minutes for three hours. Observations for the unweighted slurry with inhibitor (Example 16) and the weighted slurry with inhibitor (Example 17) are presented in Tables 27 and 28 respectively.

TABLE 27

Example 16 - Unweighted Thermatek Slurry of Example 12 with Inhibitor heated at 150° F. (66° C.)

| Time (Minutes) | Observations |
| --- | --- |
| 30 | completely liquid; swirled easily. |
| 60 | slightly thicker, but still liquid; swirls. |
| 90 | thick liquid; swirls slightly. |
| 120 | thicker, pudding-like; will not swirl; inserted spatula stands alone. |
| 150 | thicker, grading to firm. |
| 180 | firm, grading to very firm; slightly hard at bottom with spatula difficult to insert. |
| 300 | set hard. |

TABLE 28

Example 17 - Weighted Thermatek Slurry of Example 13 with Inhibitor heated at 150° F. (66° C.)

| Time (Minutes) | Observations |
| --- | --- |
| 30 | thick liquid; slightly thicker at edges and bottom, but can be swirled. |
| 60 | slightly thicker, but still liquid; more difficult to swirl. |
| 90 | thicker, pudding-like; will not swirl; inserted spatula stands alone. |
| 120 | thicker, grading to firm. |
| 150 | firm, grading to very firm; slightly firmer at bottom. |
| 180 | very firm, grading to hard; difficult to insert spatula. |
| 300 | set hard. |

After three hours all samples were very firm to almost hard. An inserted spatula would stand alone, but the samples were not considered to be set hard. The samples were allowed to remain in the oven undisturbed for another two hours. They were both set hard after a total of five hours. The data show that the R-Tek inhibitor significantly extended the final setting times of both the unweighted and weighted compositions.

Example 18

Acid Solubility

The hardened slurry composition of Example 12 was tested for acid solubility. Acid solubility is an important requirement for wellbore compositions of the invention because an acid solvent may be used to remove the hardened composition from the wellbore. The ability to remove the composition from the well bore provides a greater degree of control over the drilling operation.

A one-half inch cube sample of the cured composition according to Example 12 was obtained. The cube was placed in a container with 100 mL of a solution of aqueous 15% hydrochloric acid (HCl). Observations were made with respect to the solubilization of the cube.

After 30 to 40 minutes, the cube was observed to be solubilized with only a trace amount of insoluble debris present in the beaker. The solid state form of the inventive composition is almost totally soluble in 15% HCl solution.

Example 19

Non-Invasiveness

Compositions of the invention were evaluated for their noninvasive properties with respect to geological formations surrounding the wellbore. Noninvasiveness is an important property of the invention because filtrate and composition flow into surrounding earthen formations can be limited thereby minimizing potential damage to the reservoirs and surrounding earthen formations. The noninvasive nature of the composition is also desirable because that property facilitates removal of the hardened composition from the well bore because the composition can be contacted and solubilized by an acid solution.

Core permeability tests were performed in order to determine the non-invasiveness of the compositions. The purpose of the experiments was to compare the permeability of the cores after placement of the composition within the cores against the return permeability of the cores after solubilization and removal of the hardened composition. The extent to which core permeability is restored is a measure of the extent to which the composition is non-invasive. A composition which significantly invades the surrounding formation will not be accessible to, or removable by, an acid solvent and is, therefore, considered invasive.

The tests of Example 19 simulate placement of the composition into a wellbore shaft. Three inch deep Berea sandstone cores of 100 and 300 md (air permeability) were selected for the experiment. A 4% ammonium chloride solution was selected as a reference brine for determination of initial and final permeability of cores. The flow rate of the reference brine through the three cores is provided in Table 29.

A Thermatek base formulation according to Example 12 was prepared. The slurry was injected into each core at 4000 psi differential pressure at 60° C. The Thermatek was allowed to harden. The 4% ammonium chloride solution was then injected into the cores following hardening of the Thermatek and the flow rate recorded. A 15% aqueous HCl solution was next injected into the cores to solubilize the Thermatek. Subsequently, the reference brine was injected into the cores and the flow rate was again determined and recorded.

Figure 16:
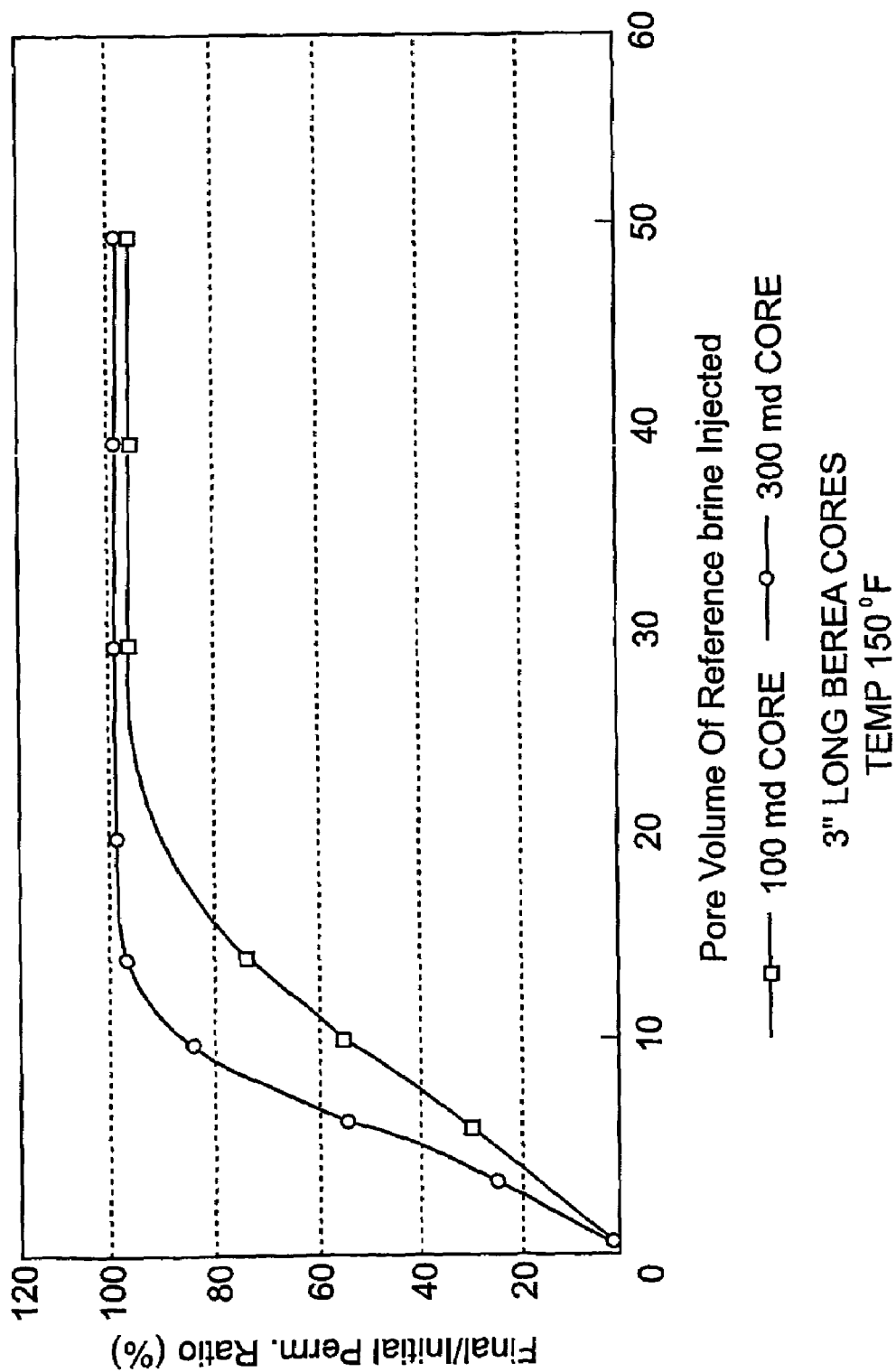

The data showing the flow of the reference brine through the Berea cores are tabulated in Table 29. The trend of return permeability behaviour in the 100 and 300 md cores are plotted in FIG. 16.

TABLE 29

Return Permeability Tests in Single Phase Conditions

| Core # | Air Permeability of Cores (md) | Permeability of Cores to Reference Brine (md) before injection of Slurry | Permeability of Cores to Reference Brine after injection of Slurry (md) | Permeability of Cores to Reference Brine after injection of 15% HCL (md) |
|---|---|---|---|---|
| 1 | 300 | 210 | 0 | 210 |
| 2 | 100 | 35 | 1 | 34 |

The data show that the hardened form of the composition sealed the cores and blocked essentially all flow of the reference brine through the cores. After an aqueous 15% HCl solution was injected into the cores the flow rate of the reference brine was fully restored. These data demonstrate that the hardened form of the composition is not invasive because the composition did not significantly flow into the porous sandstone material surrounding the cores thereby permitting the composition to be solubilized and removed from the cores. These data further demonstrate that the composition is essentially 100% soluble in an aqueous 15% HCl solution.

Examples 20–21

Base Slurry Density Reduction by Dilution

In Examples 20 and 21, exemplary compositions of the invention were diluted with fresh water and seawater. The setting properties of the diluted compositions were then observed.

The fresh water dilutions were performed first. The Thermatek base slurry was prepared according to the following mixing order:

| Thermatek Base Formulation Mixing Order for Examples 20–21 | |
|---|---|
| Constituent | Amount |
| Magnesium oxide powder (Thermatek) | 238.76 g |
| Dolomite powder (Dolomite 200) | 58.24 g |
| Fresh Water | 204 mL |
| Magnesium Chloride (R-Tek) | 204 mL |

The Thermatek base composition was scaled-up to make a four barrel equivalent batch of the composition of Example 20. The base slurry had a density of 13.6 ppg (1.63 SG).

For Example 20, three fresh water slurry dilutions were prepared with densities of 12.5 ppg (1.50 SG), 11.5 ppg (1.38 SG) and 10.5 ppg (1.26 SG). V-Tek viscosity modifier was added to each slurry as a strengthening agent and to limit any separation of the slurry constituents. The cut-backs were calculated as follows:

TABLE 30

Example 20 - Base Slurry Compositions Diluted with Fresh Water

| Constituent | 12.5 ppg (1.50 SG) Dilution | 11.5 ppg (1.38 SG) Dilution | 10.5 ppg (1.26 SG) Dilution |
|---|---|---|---|
| Thermatek slurry | 276.85 mL (451.27 g) Thermatek | 210.35 mL (342.87 g) Thermatek | 144.20 mL (235.05 g) Thermatek |
| Fresh water | 73.15 g fresh water | 139.65 g fresh water | 205.80 g fresh water |
| V-Tek Viscosity Modifier | 4 ppb | 12 ppb | 30 ppb |

The rheological properties of the three fresh-water-diluted samples were as follows:

TABLE 31

Rheological Properties of Example 20 - Fresh Water Diluted Thermatek Slurries

| | Sample 1 | Sample 2 | Sample 3 |
|---|---|---|---|
| Density, ppg/SG | 12.5/1.50 | 11.75/1.41 | 10.9/1.31 |
| Rheology Temp., °F./°C. | 75/23.9 | 75/23.9 | 74/23.3 |
| 600 rpm | 23 | 15 | 11 |
| 300 rpm | 13 | 8 | 5 |
| 200 rpm | 10 | 6 | 4 |
| 100 rpm | 6 | 4 | 2 |
| 6 rpm | 3 | 2 | 1 |
| 3 rpm | 3 | 2 | 1 |
| PV, cP | 10 | 7 | 6 |
| YP, lb./100 ft.$^2$ | 3 | 1 | −1 |
| 10-Second Gel Strength, lb./100 ft.$^2$ | 7 | 4 | 2 |
| 10-Minute Gel Strength, lb./100 ft.$^2$ | — | — | — |

The three fresh water cut-back samples shown in Table 30 were placed in a static oven at 150° F. (66° C.) and ambient pressure. The time required for a hard set for the 12.5 ppg dilution was 105 minutes and for the 11.5 ppg dilution was 135 minutes.

With respect to the 10.5 ppg dilution, that sample exhibited approximately 10% free water separation on the surface after 45 minutes in the oven. After 180 minutes, about 5% of the free water had evaporated but the sample was not set hard. The 10.5 ppg dilution sample was left in the oven for 16 hours. The free water had evaporated but the sample was only slightly harder than it was at 180 minutes.

In Example 21, a new batch of the exemplary base composition was scaled-up to make a fresh four barrel equivalent batch of the composition. The base slurry again had a density of 13.6 ppg (1.63 SG). The composition was diluted with environmental seawater as set forth in Table 32. V-Tek was added to the three dilutions as shown in Table 31. The V-Tek was provided as a strengthening agent and in a sufficient amount to limit any separation of the constituents. The three dilution samples of Example 21 were as follows:

TABLE 32

Example 21 - Base Slurry Compositions Diluted with Seawater

| Constituent | 12.5 ppg (1.50 SG) Dilution | 11.5 ppg (1.38 SG) Dilution | 10.5 ppg (1.26 SG) Dilution |
|---|---|---|---|
| Thermatek slurry | 275.10 mL (448.41 g) Thermatek | 206.85 mL (337.17 g) Thermatek | 138.95 mL (226.49 g) Thermatek |
| Seawater | 76.10 g seawater | 145.44 g seawater | 214.43 g seawater |
| V-Tek Viscosity Modifier | 4 ppb | 12 ppb | 20 ppb |

The rheological properties of the three seawater-diluted samples of Example 21 were as follows:

TABLE 33

Rheological Properties of Example 21 - Seawater Diluted Thermatek Slurries

| | Sample 1 | Sample 2 | Sample 3 |
|---|---|---|---|
| Density, ppg/SG | 12.5/1.50 | 11.7/1.40 | 10.75/1.29 |
| Rheology Temp., ° F./° C. | 73/22.8 | 75/23.9 | 74/23.3 |
| 600 rpm | 25 | 15 | 11 |
| 300 rpm | 14 | 8 | 6 |
| 200 rpm | 10 | 6 | 4 |
| 100 rpm | 6 | 4 | 3 |
| 6 rpm | 3 | 2 | 1 |
| 3 rpm | 3 | 1 | 1 |
| PV, cP | 11 | 7 | 5 |
| YP, lb./100 ft.$^2$ | 3 | 1 | 1 |
| 10-Second Gel Strength, lb./100 ft.$^2$ | 6 | 3 | 2 |
| 10-Minute Gel Strength, lb./100 ft.$^2$ | — | — | — |

Static setting time results for the three seawater diluted samples were similar to those of the three fresh-water-diluted samples. The 12.5 ppg dilution of Example 21 was hard set in 105 minutes while the 11.5 ppg dilution of Example 21 was hard set in 135 minutes.

With respect to the 10.5 ppg dilution, that sample exhibited approximately 10% free water separation on the surface after 45 minutes in the oven. At 180 minutes the free water had evaporated to about 5% and the sample was very firm but not set hard. After remaining in the oven for another 16 hours, the 10.5 ppg dilution was slightly firmer, but still not set hard. A spatula could be inserted to the bottom of the sample with some force. The sample was crumbly, chalky and tacky with a consistency similar to a bar of bath soap.

Examples 20 and 21 show that the compositions of the invention can be prepared in a broad range of dilutions. The inventive magnesium oxychloride can be present in an amount greater than about 30% to about 70% of the composition. A preferred range for the magnesium oxychloride is between about 40–70%. The composition will form a solid-state material when diluted with either fresh water or environmental sea water.

Example 22

TABLE 34

Setting Properties (130° C. 5% Inhibitor)

| Time (Minutes) | Temperature (° C.) | Pressure (PSI) | Viscosity (Bc) |
|---|---|---|---|
| 0–48 | <126 | <10,000 | 0 |
| 48–50 | 130 | 10,000 | 0 |
| 50–53 | 130 | 10,000 | 0 |
| 53–55 | 130 | 10,000 | 0 |
| 55-57 | 130 | 10,000 | POD |
| 58 (measurement 1) | 130 | 10,000 | 40 |
| 59 (measurement 2) | 130 | 10,000 | 70 |
| 60 (measurement 3) | 130 | 10,000 | 100 |

Figure 17:
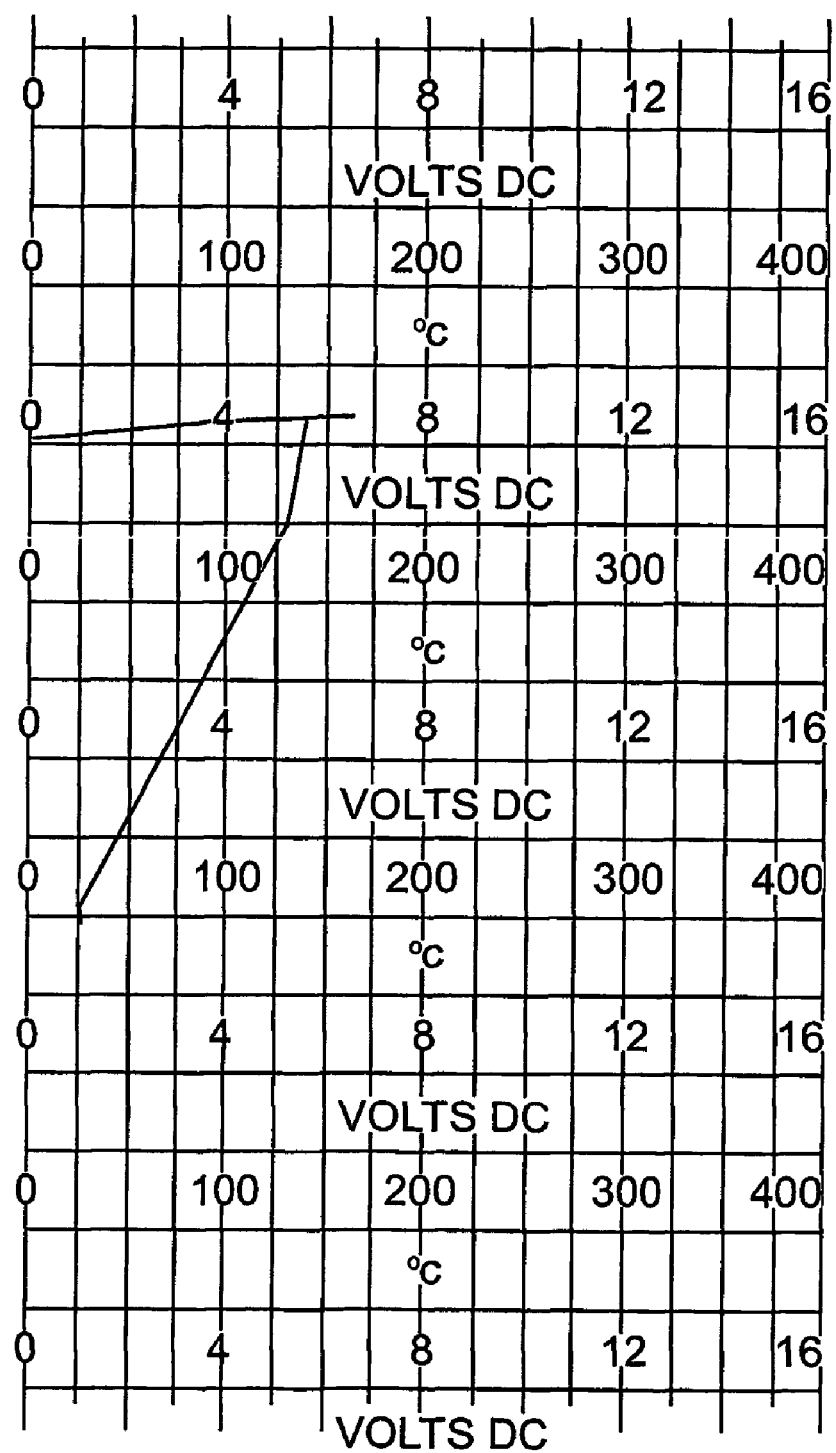

Example 22 is an evaluation of Baymag 96-200 MgO showing the same characteristics but at a higher temperature and using different MgO but otherwise with the same base formulation as described in Example 11 above. Phase transition normally occurred more rapidly at the higher ambient temperatures. The phase transition of the composition in Example 22 began to occur at 57 minutes. The observed composition temperature at 57 minutes was between about 130–134° C. The surrounding temperature, therefore, affected the rate at which the composition reached the approximate 134° C. composition temperature required for the phase transition to occur. The phase transition occurs more rapidly at elevated temperatures. However, the flat viscosity profile remains the same with the attendant right angle set at the phase transition. The right-angle set is seen in FIG. 17.

Example 23

Figure 18:
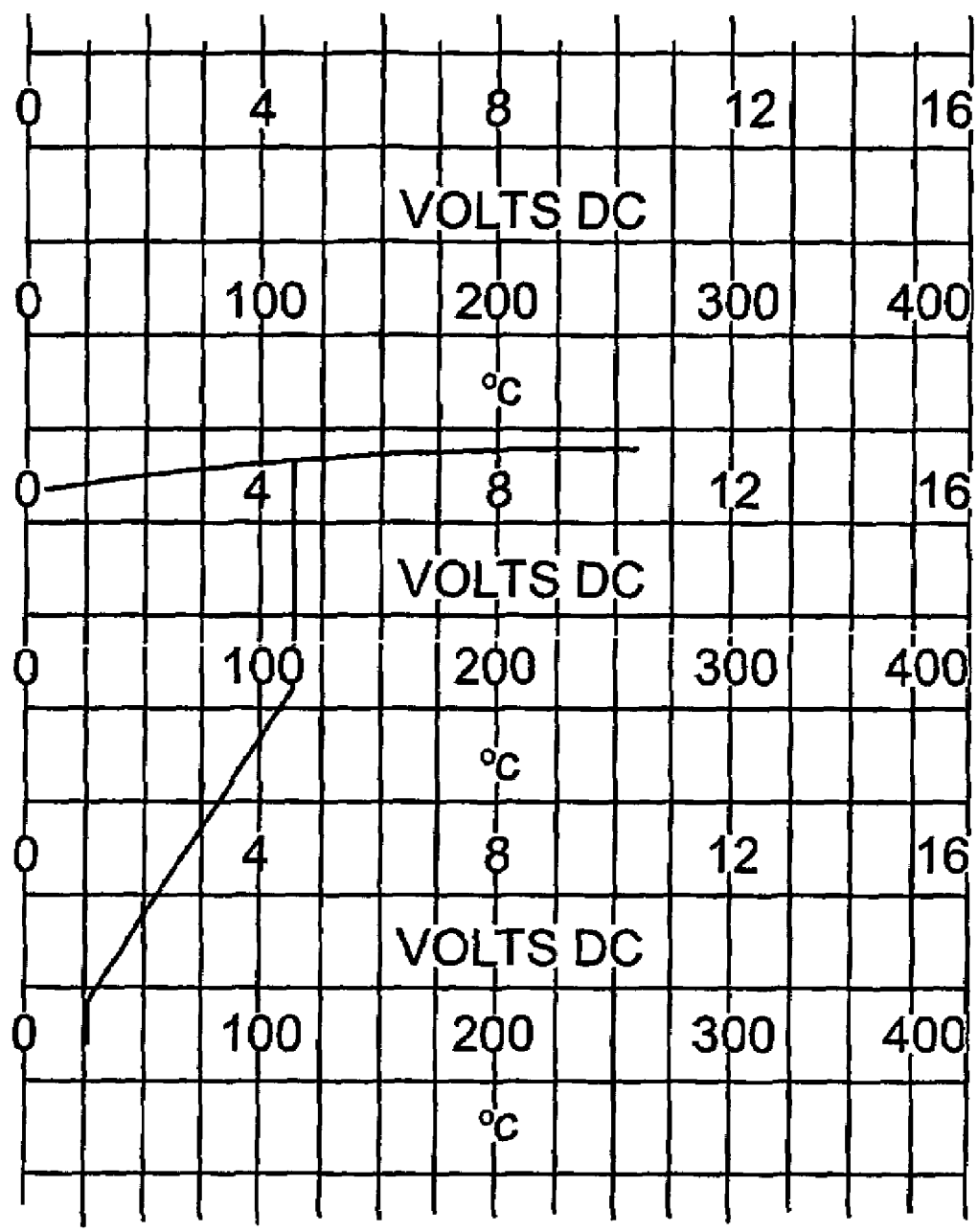

Example 23 includes an evaluation of a composition according to Example 22, but heated to a slightly lower temperature. The specimen of Example 23 was prepared according to the base formulation of the invention but replacing the MgO with Baymag 96-200. Because of the lower temperature the R-Tek inhibitor was reduced to 8.2 grams, Or 2%, in the composition. The oil bath was heated to a temperature of 110° C. with a 30 minute time ramp. Consistometer pressure was set to 10,000 psi. Temperature, pressure and viscosity data are presented in FIG. 18 and Table 35 below.

TABLE 35

Setting Properties for Example 23 (110° C./2% Inhibitor)

| Time (Minutes) | Temperature (° C.) | Pressure (PSI) | Viscosity (Bc) |
|---|---|---|---|
| 0–20 | <83 | <10,000 | 0 |
| 24 | 96 | 10,000 | 0 |
| 26 | 101 | 10,000 | 0 |
| 28 | 107 | 10,000 | 0 |
| 30 | 110 | 10,000 | 0 |
| 58 | 110 | 10,000 | POD |
| 59 | 110 | 10,000 | 100 |

Example 23 demonstrates that the composition began to undergo the phase transition at about 58 minutes. The composition formed a solid at about 59 minutes. The characteristic right-angle set is again evident in FIG. 18. The observed composition temperature at 57–59 minutes was about 110 ° C. As expected, more time was required for the composition to set because of the lowered oil bath temperature versus that in Example 22. The data in Table 35 and FIG. 18 demonstrate that the phase transition of the composition is the same as in Table 34, and occurs at an approximate observed composition temperature of about 110° C. As with the lower temperature MgO the relationship between the temperature/time and inhibitor is linear demonstrating the predictability (and therefore the controllability) of the composition at differing temperatures.

Example 24

Figure 19:
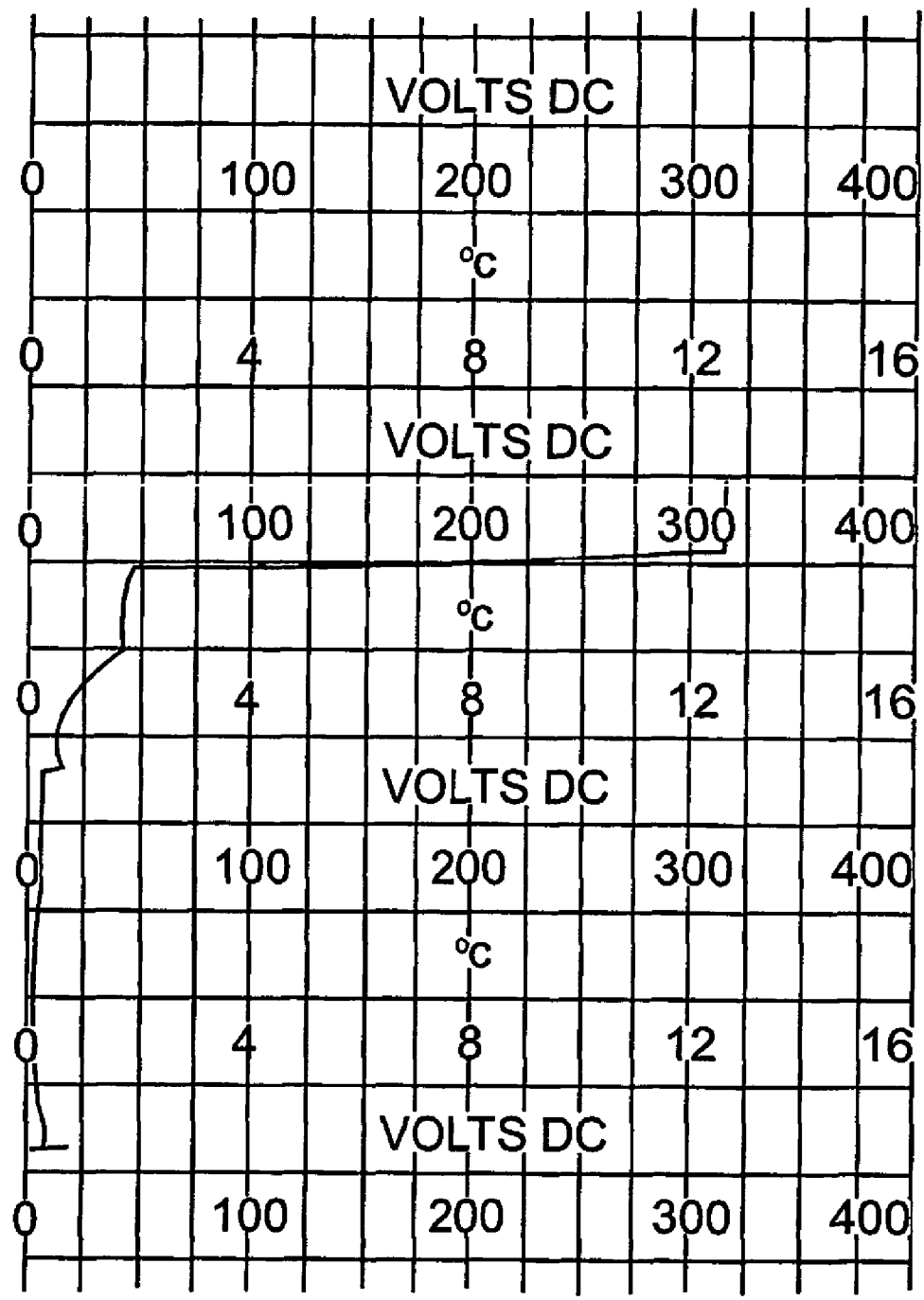

Example 24 is an evaluation of Lycal 93/12F MgO at a lower temperature of 29° C. as compared with the temperatures used in previous examples. Because of the lower temperature of the exothermic reaction to reach the POD is slower. The graph in FIG. 19 shows a gradual increase in pumpable viscosity up to the POD which is almost instantaneous, with the set showing an absolute right angle. The formulation content ratios are the same for all the tests at high, medium and low temperatures, showing the same set characteristics at greatly lowered temperatures, as per the previously documented higher temperature data using different MgOs but otherwise with the same base formulation. Phase transition normally occurs more slowly at lower ambient temperatures. The phase transition of Example 24 began to occur at 67 minutes. The observed composition temperature at 67 minutes was 29° C. The surrounding temperature, therefore, affected the rate at which the composition reaches the composition temperature required for the phase transition to occur. However, the viscosity profile is higher because of the low temperature. The attendant right angle set at the phase transition is however, extremely rapid. The right-angle set is seen in FIG. 19.

TABLE 36

Setting Properties (29° C. No Inhibitor)

| Time (Minutes) | Temperature (° C.) | Pressure (PSI) | Viscosity (Bc) |
|---|---|---|---|
| 0–5 | <21 | <4000 | 10 |
| 5–10 | 25 | 4000 | 5 |
| 10–15 | 29 | 4000 | 5 |
| 53–55 | 29 | 4000 | 8 |
| 45–48 | 29 | 4,000 | 10 |
| 58 (measurement 1) | 29 | 4000 | 48 |
| 67 (measurement 2) | 29 | 4000 | 48 |
| 68 (measurement 3) | 29 | 4000 | 100 |

Example 25

Figure 20:
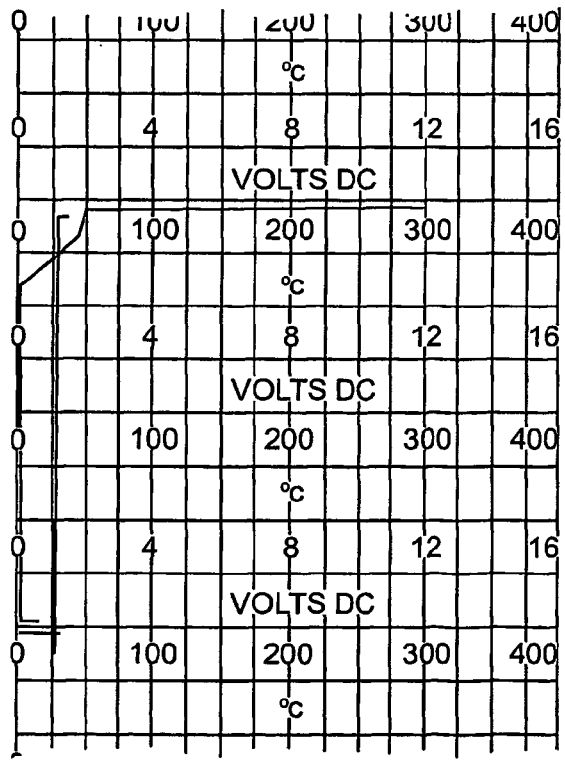

Example 25 employs the same composition as Example 24, shown in table 36 but substituting Baymag/40 for Lycal 93/12F. The consistometer results are shown in FIG. 20. In this example the final POD is the same. However, the viscosity profile prior to POD has a much lower and flatter profile. Again, as in Example 24 the POD is extremely rapid. The characteristic right-angle set is again evident in FIG. 20. The required composition temperature remained at 29° C. was ramped over 15 minutes. The composition temperature remained at 29° C. for 63 minutes until the POD. This was 10 minutes longer than the total time taken to POD by the Lycal 93/12F MgO.

TABLE 37

Setting Prop for Example 24 (29° C./No Inhibitor)

| Time (Minutes) | Temperature (° C.) | Pressure (PSI) | Viscosity (Bc) |
|---|---|---|---|
| 0–5 | <24 | <4000 | 0 |
| 5–10 | 27 | 4000 | 0 |
| 10–15 | 29 | 4000 | 0 |
| 28 | 29 | 4000 | 0 |
| 60 | 29 | 4000 | 0 |
| 68 | 29 | 4000 | 26 |
| 78 | 29 | 4000 | 100 POD |

The compositions are useful in treating wellbores in order to seal them as described herein, but certain embodiments may also find use in methods of treating wells for squeezing compositions into the formation in order to affect the formation outwith the wellbore itself. For example, the composition can bond to sandy or shale formations to consolidate them, to seal off faults or fissures in the formation, or to isolate one zone of the formation from another, which can optionally be carried out in the absence of remedial operations to correct an apparent deficiency in the formation being treated. The composition can also be used to seal faults or fissures in the formation outwith the wellbore.

It should be understood that the composition may be used in applications other than hydrocarbon drilling operations. The composition can be used in any drilling operation where control over underground substances, such as fluids, gases and particulates, is desired. The composition may also be used in applications in addition to those involving the sealing of wellbores. Such uses include remedial and work over operations—operations in which the acid solubility and non-invasiveness of the composition would be particularly useful properties.

While the principles of this invention have been described in connection with specific embodiments, it should be understood clearly that these descriptions are made only by way of example and are not intended to limit the scope of the invention.

What is claimed is:

1. A composition for controlling wellbore fluid and gas invasion which is initially a flowable slurry and forms, upon undergoing a phase transition, a substantially solid state mass comprising:
    about 70 to 30% by weight of magnesium oxychloride; and
    about 70 to 30% by weight of water; and
    wherein,
    the composition phase transition from the flowable slurry to the solid state is rapid with formation of little or no gel state;
    the composition has a near-linear relationship between the time required for the phase transition to occur and the composition temperature at which the phase transition occurs; and
    the phase transition occurs when the composition reaches a temperature of between about 100–140° C.

2. The composition of claim 1 wherein formation of the slurry produces an exothermic reaction.

3. The composition of claim 1 wherein the composition is a reaction product comprising an admixture of:
    about 70 to 50% by weight of a brine solution comprising an admixture of magnesium chloride and water; and
    about 50 to 30% by weight of magnesium oxide powder.

4. The composition of claim 3 wherein the magnesium oxide powder has a median particle size diameter of about 2–8 μ.

5. The composition of claim 3 wherein the magnesium oxide powder has a bulk density of about 1.1 to about 3 g/cm$^3$.

6. The composition of claim 3 further including about 0.86 to 7.0% by weight of the magnesium oxide of an inhibitor for controlling formation of the substantially solid state mass.

7. The composition of claim 6 wherein the inhibitor is selected from the group consisting of sodium hexametaphosphate, potassium magnesium phosphate hexahydrate and potassium magnesium hexametaphosphate.

8. The composition of claim 1 further including about 1 to 25% by weight of a filler for controlling slurry viscosity.

9. The composition of claim 8 wherein the filler is dolomite.

10. The composition of claim 1 further including about 5 to 40% by weight of at least one weighting agent for controlling slurry mass.

11. The composition of claim 10 wherein the weighting agent is selected from the group consisting of calcium carbonate, barite, galena and mixtures thereof.

12. The composition of claim 1 further including about 1 to 10% by weight of at least one accelerating agent for increasing the rate at which the flowable slurry forms the substantially solid state mass.

13. The composition of claim 12 wherein the accelerating agent is aluminum sulfate.

14. The composition of claim 1 further including about 1 to 40% by weight of at least one strengthening agent.

15. The composition of claim 14 wherein the strengthening agent is selected from the group consisting of fine silica, coarse silica and mixtures thereof.

16. The composition of claim 1 wherein the phase transition occurs when the composition reaches a temperature of between about 110–134° C.

17. A slurry composition for controlling wellbore fluid and gas invasion which is initially in a flowable state and, upon undergoing a phase transition, is in a substantially solid state comprising:
    about 70 to 30% by weight of magnesium oxychloride; and
    about 70 to 30% by weight of water; and wherein
    the composition has a density of about 1.4–1.6 kg/L and a viscosity of about 18–30 cP when in the flowable state;
    the composition phase transition from the flowable state to the solid state is rapid with formation of little or no gel state;
    the composition undergoes the phase transition from the flowable to the solid state when the composition reaches a temperature of about 100–140° C.; and
    the composition has a near-linear relationship between the time required for the phase transition to occur and the composition temperature at which the phase transition occurs.

18. The composition of claim 17 wherein formation of the slurry produces an exothermic reaction.

19. The composition of claim 17 wherein the solid state form of the composition has a compressive strength of about 1,000 to 7,000 psi.

20. The composition of claim 17 wherein the solid state form of the composition is soluble in a solution containing about 15% by weight of hydrochloric acid.

21. The composition of claim 17 wherein the composition is a reaction product comprising an admixture of:
    about 70 to 50% by weight of a brine solution comprising an admixture of magnesium chloride and water; and
    about 50 to 30% by weight of magnesium oxide powder.

22. The composition of claim 17 wherein the composition undergoes the phase transition from the flowable to the solid state when the composition reaches a temperature of about 110–134° C.

23. A method of treating a wellbore or a portion thereof, the method comprising:
    preparing a brine solution comprising an admixture of magnesium chloride salt and water;
    adding about 50 to 30% by weight of magnesium oxide powder to the brine solution;
    agitating the brine solution and magnesium oxide powder to form a slurry;
    placing the slurry into the well or portion thereof; and
    solidifying the slurry, said solidifying step being characterized by the slurry undergoing a phase transition from a flowable slurry to a substantially solid state upon reaching a slurry temperature of between about 100–140° C. said phase transition being rapid with formation of little or no gel state and the slurry having a near-linear relationship between the time required for the phase transition to occur and the slurry temperature at which the phase transition occurs; whereby a seal is formed along the well or a portion thereof.

24. The method of claim 23, wherein the solidifying step comprises, at least in part, geothermal heating of the slurry to a slurry temperature of about 100–140° C. whereupon the heated slurry undergoes the phase transition from the flowable to the solid state.

25. The method of claim 23, further including, at any time before the placing step, the step of adding at least one filler, the filler comprising about 1 to 25% by weight of the slurry.

26. The method of claim 25 wherein the filler is dolomite.

27. The method of claim 23, further including, before the placing step, the step of adding about 0.86 to 7.0% by weight of the magnesium oxide of an inhibitor to inhibit solidification of the slurry.

28. The method of claim 27 wherein the inhibitor is selected from the group consisting of sodium hexametaphosphate, potassium magnesium phosphate hexahydrate and potassium magnesium hexametaphosphate.

29. The method of claim 23, further including, before the placing step, the step of adding about 5 to 61% by weight of the slurry of at least one weighting agent to modify slurry mass.

30. The method of claim 29 wherein the weighting agent is selected from the group consisting of calcium carbonate, barite, galena and mixtures thereof.

31. The method of claim 23, further including, before the placing step, the step of adding about 1 to 10% by weight of the slurry of at least one accelerating agent for increasing the rate at which the slurry forms a solid.

32. The method of claim 31 wherein the accelerating agent is aluminum sulfate.

33. The method of claim 23, further including, before the placing step, the step of adding about 1 to 50% by weight of the slurry of at least one strengthening agent.

34. The method of claim 33 wherein the strengthening agent is selected from the group consisting of fine silica, coarse silica and mixtures thereof.

35. The method of claim 23 wherein the solidifying step is characterized, at least in part, by the slurry undergoing a phase transition from a flowable slurry to a substantially solid state upon reaching a slurry temperature of between about 110–134° C.

* * * * *

UNITED STATES PATENT AND TRADEMARK OFFICE
CERTIFICATE OF CORRECTION

| | | |
|---|---|---|
| PATENT NO. | : 7,044,222 B2 | Page 1 of 1 |
| APPLICATION NO. | : 10/297752 | |
| DATED | : May 16, 2006 | |
| INVENTOR(S) | : Tomlinson | |

It is certified that error appears in the above-identified patent and that said Letters Patent is hereby corrected as shown below:

In column 1, line 7, delete "which is a continuation of" and insert --which claims the benefit of--.

In column 7, line 3 delete "IICl" and insert --HCl--.

In column 8, line 27, delete "$MgCl_2.6H_2O$" and insert --$MgCl_2 \cdot 6H_2O$--.

In column 10, line 23, after "thereof" add --.--.

In column 24, line 52, Table 15, delete "209" and insert --200--.

In column 27, line 48, delete "Theological" and insert --rheological--.

In column 28, line 27, Table 25, after "spatula still penetrated" insert --with difficulty--.

In column 28, line 59, Table 26, delete "P.G" and insert --P.G.--.

In column 34, line 43, delete "Or" and insert --or--.

In column 35, line 12 through column 36, line 13, delete the text and tables beginning with "Example 24" through the entirety of "Table 37".

Delete Figures 19 and 20.

Signed and Sealed this

Twenty-fifth Day of December, 2007

JON W. DUDAS
*Director of the United States Patent and Trademark Office*